US010885044B2

(12) United States Patent
Zhang et al.

(10) Patent No.: US 10,885,044 B2
(45) Date of Patent: Jan. 5, 2021

(54) TECHNIQUES FOR DEVICE CONFIGURATION FOR COMMERCE MESSAGING USING COMMERCE MESSAGING HISTORY INFORMATION

(71) Applicant: Facebook, Inc., Menlo Park, CA (US)

(72) Inventors: Edward Young Zhang, San Francisco, CA (US); Weiwei Ding, Fremont, CA (US); Qian Wang, Fremont, CA (US); Tsung-Chuan Chen, Palo Alto, CA (US); Guangyuan Liu, Union City, CA (US)

(73) Assignee: FACEBOOK, INC., Menlo Park, CA (US)

( * ) Notice: Subject to any disclaimer, the term of this patent is extended or adjusted under 35 U.S.C. 154(b) by 461 days.

(21) Appl. No.: 15/350,004

(22) Filed: Nov. 11, 2016

(65) Prior Publication Data

US 2017/0295120 A1    Oct. 12, 2017

Related U.S. Application Data

(60) Provisional application No. 62/321,080, filed on Apr. 11, 2016, provisional application No. 62/320,855, filed on Apr. 11, 2016.

(51) Int. Cl.
*G06F 16/2457* (2019.01)
*H04W 4/12* (2009.01)
(Continued)

(52) U.S. Cl.
CPC ...... *G06F 16/24578* (2019.01); *G06F 16/248* (2019.01); *H04L 51/02* (2013.01);
(Continued)

(58) Field of Classification Search
CPC . G06F 16/24578; G06F 16/248; H04L 51/02; H04L 51/063; H04L 51/066;
(Continued)

(56) References Cited

U.S. PATENT DOCUMENTS 6,741,855 B1   5/2004  Martin et al.
7,979,501 B1   7/2011  Coleman et al.
(Continued)

FOREIGN PATENT DOCUMENTS

KR   10-2015-0037804   4/2015

OTHER PUBLICATIONS

Mathsisfun.com, Linear Equations, pp. 1-3, Apr. 19, 2012.
(Continued)

*Primary Examiner* — Tauqir Hussain

(57) ABSTRACT

Various embodiments are generally directed to techniques for device configuration using commerce messaging history information. In one embodiment, an apparatus may comprise a client front-end component operative to receive a client inbox request for a user account from a client device, the user account for a messaging system; and transmit an ordered business promotion contact list to the client device in response to the client inbox request; a business contact list component operative to determine a business promotion contact list for a user account for a messaging system; a predicted interest component operative to determine a predicted business messaging interest for each business contact on the business promotion contact list; and a contact ranking component operative to determine a ranking weight for each business contact on the business promotion contact list based on the predicted business messaging interest for each business contact. Other embodiments are described and claimed.

20 Claims, 14 Drawing Sheets

(51) Int. Cl.
    *H04L 12/58*     (2006.01)
    *H04L 29/08*     (2006.01)
    *G06F 16/248*     (2019.01)
    *H04L 29/06*     (2006.01)
    *G06N 20/00*     (2019.01)
    *G06N 5/02*     (2006.01)

(52) U.S. Cl.
CPC .......... *H04L 51/063* (2013.01); *H04L 51/066* (2013.01); *H04L 51/28* (2013.01); *H04L 51/32* (2013.01); *H04L 65/4076* (2013.01); *H04L 67/02* (2013.01); *H04L 67/04* (2013.01); *H04L 67/125* (2013.01); *H04L 67/20* (2013.01); *H04L 67/22* (2013.01); *H04L 67/306* (2013.01); *H04L 67/42* (2013.01); *H04W 4/12* (2013.01); *G06N 5/02* (2013.01); *G06N 20/00* (2019.01); *H04L 51/16* (2013.01); *H04L 51/18* (2013.01)

(58) Field of Classification Search
CPC ......... H04L 51/28; H04L 51/32; H04L 67/02; H04L 67/04; H04L 67/125; H04L 67/20; H04L 67/22; H04L 65/4076; H04W 4/12
USPC ......................................................... 709/206
See application file for complete search history.

(56) References Cited

U.S. PATENT DOCUMENTS

| | | | |
|---|---|---|---|
| 8,166,120 | B2 | 4/2012 | Kunz et al. |
| 8,428,777 | B1 | 4/2013 | Poursohi et al. |
| 8,539,361 | B2 | 9/2013 | Hardy et al. |
| 8,738,648 | B2* | 5/2014 | Denenberg ............ G06F 16/907 |
| | | | 707/770 |
| 8,762,462 | B1 | 6/2014 | Duddu et al. |
| 8,769,414 | B2 | 7/2014 | Tsuei |
| 8,793,591 | B1 | 7/2014 | Coleman et al. |
| 8,886,390 | B2 | 11/2014 | Wolfe et al. |
| 9,311,683 | B1 | 4/2016 | Saylor et al. |
| 9,411,506 | B1 | 8/2016 | Prado et al. |
| 9,450,901 | B1 | 9/2016 | Smullen et al. |
| 9,491,281 | B2 | 11/2016 | Kim et al. |
| 9,628,575 | B1 | 4/2017 | Lewis et al. |
| 9,661,087 | B1 | 5/2017 | Lewis et al. |
| 9,672,289 | B1 | 6/2017 | Frind et al. |
| 9,811,586 | B2 | 11/2017 | Wetherell et al. |
| 9,923,851 | B1 | 3/2018 | Sprauve et al. |
| 9,934,286 | B2* | 4/2018 | Roth ....................... H04L 51/22 |
| 10,230,668 | B2* | 3/2019 | Ji .......................... G06F 16/951 |
| 10,372,508 | B2 | 8/2019 | Hosabettu et al. |
| 10,412,030 | B2 | 9/2019 | McGregor, Jr. et al. |
| 2002/0120702 | A1 | 8/2002 | Schiavone et al. |
| 2003/0200190 | A1 | 10/2003 | Adar et al. |
| 2005/0005249 | A1 | 1/2005 | Hill et al. |
| 2005/0050301 | A1 | 3/2005 | Whittle et al. |
| 2005/0222985 | A1 | 10/2005 | Buchheit et al. |
| 2006/0259555 | A1 | 11/2006 | Hassounah et al. |
| 2007/0157105 | A1 | 7/2007 | Owens et al. |
| 2007/0204308 | A1 | 8/2007 | Nicholas et al. |
| 2008/0086343 | A1* | 4/2008 | Pendergraft ....... G06Q 10/0637 |
| | | | 705/7.29 |
| 2008/0089490 | A1 | 4/2008 | Mikkonen et al. |
| 2008/0162651 | A1 | 7/2008 | Madnani |
| 2008/0220877 | A1 | 9/2008 | Guthrie |
| 2008/0248788 | A1 | 10/2008 | Smith et al. |
| 2008/0250323 | A1 | 10/2008 | Huff |
| 2009/0254616 | A1 | 10/2009 | Cheung et al. |
| 2010/0274628 | A1 | 10/2010 | Kunz et al. |
| 2011/0179164 | A1 | 7/2011 | Memon et al. |
| 2011/0231499 | A1 | 9/2011 | Stovicek et al. |
| 2011/0246907 | A1* | 10/2011 | Wang .................... G06Q 10/10 |
| | | | 715/751 |
| 2012/0102126 | A1* | 4/2012 | Murphy .................. H04L 67/22 |
| | | | 709/206 |
| 2012/0246337 | A1 | 9/2012 | Ross |
| 2012/0278388 | A1* | 11/2012 | Kleinbart ............... G06Q 10/10 |
| | | | 709/204 |
| 2012/0322041 | A1 | 12/2012 | Weisman |
| 2013/0041952 | A1* | 2/2013 | Silas ...................... G06Q 10/10 |
| | | | 709/204 |
| 2013/0198296 | A1 | 8/2013 | Roy et al. |
| 2014/0114737 | A1* | 4/2014 | Espejo ................... G06Q 30/02 |
| | | | 705/14.27 |
| 2014/0136615 | A1* | 5/2014 | Li ........................... H04L 67/22 |
| | | | 709/204 |
| 2014/0164953 | A1 | 6/2014 | Lynch et al. |
| 2014/0172840 | A1 | 6/2014 | Kumar et al. |
| 2014/0241216 | A1* | 8/2014 | Cheng ................... H04M 3/436 |
| | | | 370/271 |
| 2014/0253666 | A1 | 9/2014 | Ramachandran et al. |
| 2014/0256295 | A1 | 9/2014 | Peng et al. |
| 2015/0040027 | A1* | 2/2015 | Cheng ..................... G06F 3/0488 |
| | | | 715/747 |
| 2015/0071418 | A1* | 3/2015 | Shaffer ................. H04M 3/493 |
| | | | 379/88.01 |
| 2015/0172238 | A1 | 6/2015 | Ahmed et al. |
| 2015/0188869 | A1 | 7/2015 | Gilad et al. |
| 2015/0271118 | A1 | 9/2015 | Nudel et al. |
| 2015/0370905 | A1* | 12/2015 | Leon ...................... G06Q 10/10 |
| | | | 707/722 |
| 2016/0031081 | A1 | 2/2016 | Johnson |
| 2016/0044380 | A1 | 2/2016 | Barrett |
| 2016/0099892 | A1 | 4/2016 | Palakovich et al. |
| 2016/0117384 | A1 | 4/2016 | Akavaram et al. |
| 2016/0119390 | A1 | 4/2016 | Moeinifar |
| 2016/0132605 | A1 | 5/2016 | Jiang |
| 2016/0239547 | A1 | 8/2016 | Lim et al. |
| 2016/0247191 | A1* | 8/2016 | Bhalla ................. G06Q 30/0255 |
| 2016/0255082 | A1 | 9/2016 | Rathod |
| 2016/0261395 | A1 | 9/2016 | Agarwal et al. |
| 2016/0284005 | A1 | 9/2016 | Daniel et al. |
| 2016/0284011 | A1 | 9/2016 | Dong et al. |
| 2016/0285790 | A1 | 9/2016 | Szeto et al. |
| 2016/0285816 | A1 | 9/2016 | Schmid et al. |
| 2017/0005977 | A1 | 1/2017 | Snabl |
| 2017/0034085 | A1 | 2/2017 | Bijor et al. |
| 2017/0093779 | A1 | 3/2017 | Taliaferro et al. |
| 2017/0180276 | A1 | 6/2017 | Gershony et al. |
| 2017/0214647 | A1 | 7/2017 | Shrivastava et al. |
| 2017/0250935 | A1 | 8/2017 | Rosenberg |
| 2017/0269972 | A1 | 9/2017 | Hosabettu et al. |
| 2017/0270431 | A1 | 9/2017 | Hosabettu et al. |
| 2017/0295114 | A1 | 10/2017 | Goldberg et al. |
| 2017/0329779 | A1 | 11/2017 | Lewin-Eytan et al. |
| 2018/0020067 | A1 | 1/2018 | Sadanandan et al. |
| 2018/0060432 | A1 | 3/2018 | Kenthapadi et al. |
| 2018/0101533 | A1 | 4/2018 | Robichaud |
| 2018/0107685 | A1 | 4/2018 | Kale et al. |
| 2018/0108066 | A1 | 4/2018 | Kale et al. |
| 2018/0150524 | A1 | 5/2018 | Anger et al. |
| 2018/0356961 | A1 | 12/2018 | Lewis et al. |

OTHER PUBLICATIONS

International Search Report and Written Opinion received for PCT Patent Application No. PCT/US2016/019969, dated Nov. 21, 2016, 15 pages.

* cited by examiner

700

```
┌─────────────────────────────────────────────┐
│ Determine a business promotion contact list │
│        for a user account                   │
│        for a messaging system.              │
│                  702                        │
└─────────────────────────────────────────────┘
                      │
┌─────────────────────────────────────────────┐
│ Determine a predicted business messaging    │
│ interest for each business contact on the   │
│ business promotion contact list .           │
│                  704                        │
└─────────────────────────────────────────────┘
                      │
┌─────────────────────────────────────────────┐
│ Determine a ranking weight for each         │
│ business contact on the business promotion  │
│ contact list based on the predicted         │
│ business messaging interest for each        │
│ business contact .                          │
│                  706                        │
└─────────────────────────────────────────────┘
                      │
┌─────────────────────────────────────────────┐
│ Order the business promotion contact list   │
│ for display for the user account based on   │
│ the determined ranking weight for each      │
│ business contact on the business promotion  │
│ contact list .                              │
│                  708                        │
└─────────────────────────────────────────────┘
```

Receive a bot subscription command for a user account with a messaging system from a client device, the bot subscription command specifying a messaging bot.
722

Determine a messaging bot channel for the messaging bot.
724

Subscribe the user account to the messaging bot channel for the messaging bot in response to the bot subscription command.
726

Receive a broadcast message from the messaging bot, the messaging bot specifying a broadcast channel.
728

Add the broadcast message to a message queue for the user account when the messaging bot channel matches the broadcast channel.
730

*FIG. 7B*

TECHNIQUES FOR DEVICE CONFIGURATION FOR COMMERCE MESSAGING USING COMMERCE MESSAGING HISTORY INFORMATION

RELATED APPLICATIONS

This application claims the benefit of priority under 35 U.S.C. § 119(e) to U.S. Provisional Patent Application No. 62/321,080, titled "Techniques for Device Configuration Using Commerce Messaging History Information," filed on Apr. 11, 2016, which is hereby incorporated by reference in its entirety.

This application claims the benefit of priority under 35 U.S.C. § 119(e) to U.S. Provisional Patent Application No. 62/320,855, titled "Techniques for Device Configuration Using Messaging History Information," filed on Apr. 11, 2016, which is hereby incorporated by reference in its entirety.

This application is related to U.S. patent application Ser. No. 15/054,101, titled "Techniques for Messaging Bot App Interactions," filed on Feb. 25, 2016, which is hereby incorporated by reference in its entirety.

This application is related to U.S. patent application Ser. No. 15/054,103, titled "Techniques for Messaging Bot Rich Communication," filed on Feb. 25, 2016, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for device configuration using commerce messaging history information. Some embodiments are particularly directed to techniques for device configuration using commerce messaging history information in which a list of business contacts for promotion to a user is ordered according to ranking weights derived from the predicted messaging engagement for the user. In one embodiment, for example, an apparatus may comprise. In another embodiment, for example, an apparatus may comprise a client device.

In another embodiment, for example, an apparatus may comprise a client front-end component operative to receive a client inbox request for a user account from a client device, the user account for a messaging system; and transmit an ordered business promotion contact list to the client device in response to the client inbox request, the ordered business promotion contact list ordered for display for the user account based on a determined ranking weight for each business contact on the ordered promotion contact list; a business contact list component operative to determine a business promotion contact list for a user account for a messaging system; a predicted interest component operative to determine a predicted business messaging interest for each business contact on the business promotion contact list; and a contact ranking component operative to determine a ranking weight for each business contact on the business promotion contact list based on the predicted business messaging interest for each business contact.

In another embodiment, for example, a messaging component operative on the processor circuit to receive a bot subscription command for a user account with a messaging system from a client device, the bot subscription command specifying a messaging bot; a bot framework component operative to determine a messaging bot channel for the messaging bot; subscribe the user account to the messaging bot channel for the messaging bot in response to the bot subscription command; and receive a broadcast message from the messaging bot, the messaging bot specifying a broadcast channel; and a broadcast component operative to add the broadcast message to a message queue for the user account when the messaging bot channel matches the broadcast channel.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7A illustrates an embodiment of a first logic flow for the system of FIG. 1.

FIG. 7B illustrates an embodiment of a second logic flow for the system of FIG. 1.

DETAILED DESCRIPTION

Figure 1:
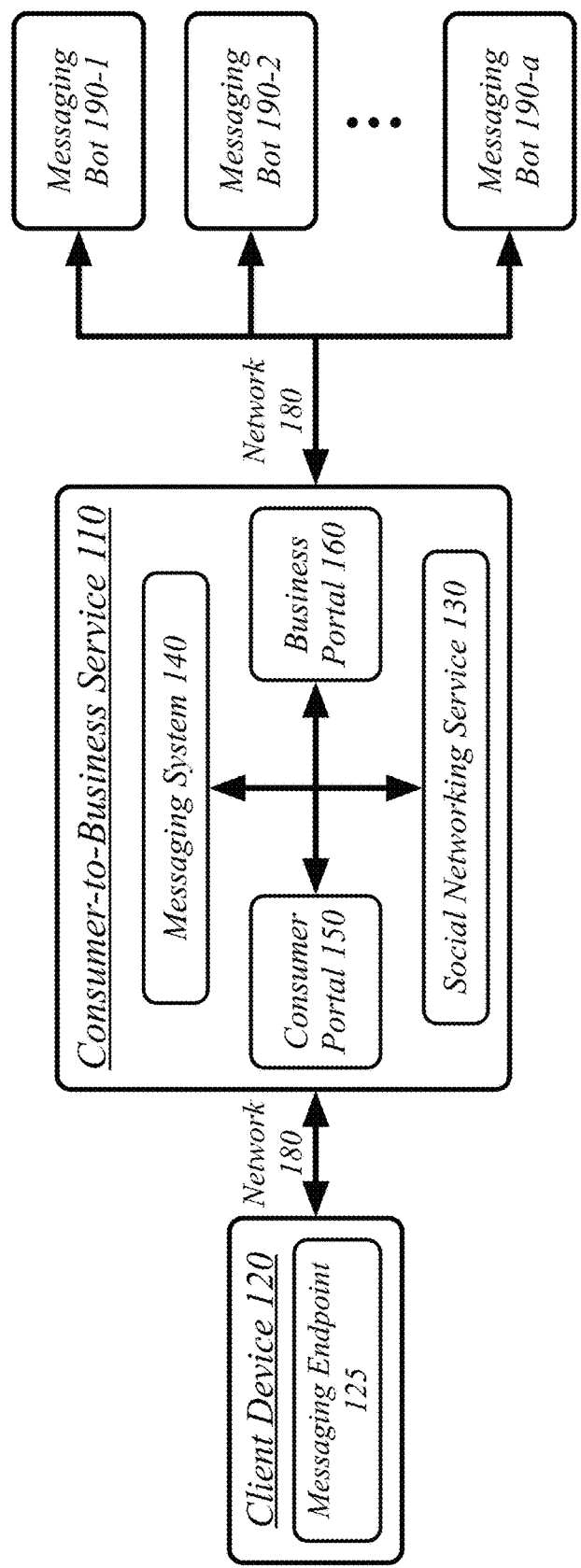
FIG. 1 illustrates an embodiment of a consumer-to-business messaging system.

Users may engage with a business via a page in a social networking service using messaging communication, as they may be familiar with from chatting with friends. Users may discover, engage with, and purchase products and services from these businesses in the same messaging application they use for communicating with friends, colleagues, and other acquaintances.

Users may be accustomed to interacting with a business via a web page. Even where this web page contains interactive or dynamic elements, the interaction is still received in the presentation style of a web page. Business pages, similar to web pages, may be accessible via a messaging system. However, where a web page may empower chatting via a pop-up dialog box, a messaging system may display a conversational interaction with a business in a messaging-specific interface. This may serve to ground the interaction in the presentation style of messaging, thereby humanizing and personalizing the experience. Further, as with messaging with another person, the messaging client may maintain a history of a conversation, allow navigation away from the conversation and returning, and a mirroring of the conversation across multiple user devices. In contrast, a pop-up messaging dialog on a web page is temporary, stuck to a browser window that cannot be closed until the conversation is completed, and rooted in a single user device. This conversation with a business page may be represented by a messaging bot, the messaging bot a virtual representation of the business page in a messaging environment. The messaging bot may function as an avatar for the business and unify the experience of messaging with a business within a single messaging representation.

Messaging bots may also be used for the one-way delivery of information. Messaging bots may provide news, media, and other content to users delivered through a messaging system. Users may subscribe to a messaging bot for a business and receive real-time messages from the messaging bot in their messaging client. Messaging bots may provide content on a variety of channels, wherein each channel corresponds to a particular interest served by the messaging bot. For instance, a messaging bot for a news agency may have different interest channels dedicated to different news topics: breaking news, elections news, domestic news, foreign news, sports news, etc. A user may specifically subscribe to a interest, or multiple interests, for a particular messaging bot and receive only the broadcast messages for that messaging bot that match their one or more selected interests.

Broadcast messages may also be further refined for particular subsets of the subscriber base for a messaging bot. A business may be motivated to refine the set of users to which a message is distributed in order to avoid overwhelming users with more messages than they want to receive, or bothering users with messages they aren't interested in, so as to avoid having users unsubscribe. As such, a messaging system may empower a business to specify criteria for narrowing the distribution of a broadcast message beyond whether a user has subscribed to a messaging bot with a particular interest. The messaging system may have access to information about users, including biographical information, contextual information (e.g., location information), and user-interest information (i.e., the topics about which the user has an interest, as may be defined separately from the interest channels to which they subscribe), without limitation. The business may therefore specify biographical criteria, contextual criteria, user-interest criteria, and other criteria in association with a broadcast message and employ the messaging system to use that criteria to select the specific subscribing users to receive a message.

Users may be suggested businesses with which to engage with. In a messaging interface a user may be displayed recent threads, such as a number of the most-recently-active threads, which may include threads with businesses as may be represented by messaging bots. This interface of recent threads may be useful to a user wishing to reengage with recent conversations. However, to increase a user's utility with a messaging system, and to increase the messaging system's engagement with a user, the user may be suggested business contacts with which they may wish to engage, either for two-way messaging interactions or subscriptions to broadcasts. This may also provide for the acquisition of new customers for businesses by encouraging the discovery of businesses within the messaging client.

Spam protection may be provided on both an individual and community-wide level. A business may be prevented from contacting individual users without at least the implied consent of those users, such as may be received by the user messaging with the business or specifically requesting that the business contact them through the messaging system. The user may be empowered to withdraw this consent, such as through the display of a prominent block button in each message thread with a business that completely prevents the business from messaging them again. This feedback may then be captured to protect the community as a whole. A business with a large amount of negative user feedback may receive reduced promotion by the messaging system, or may even be removed from the messaging system.

It will be appreciated that the techniques described herein may be used in any system where users are suggested business contacts with which to engage using a communication system, such as a messaging system, email system, voice communication system, video communication system, or any other communication system. The techniques described herein with regards to business contacts in a messaging system may be used in any embodiment in which a plurality of business contact are promoted to a user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a consumer-to-business messaging system 100. In one embodiment, the consumer-to-business messaging system 100 may comprise a computer-implemented system having software applications comprising one or more components. Although the consumer-to-business messaging system 100 shown in FIG.

1 has a limited number of elements in a certain topology, it may be appreciated that the consumer-to-business messaging system 100 may include more or less elements in alternate topologies as desired for a given implementation.

A consumer-to-business service 110 may serve as an intermediary between consumers and businesses. Consumers and businesses may both be users of the consumer-to-business service 110, with consumers represented via an individual user account and businesses represented by a commerce account and, possibly, one or more individual user accounts associated with the business, such as individual user accounts associated with representatives and other employees of the business. A consumer user may be represented with a user entity in a social graph. A business or other commercial user may be represented by a business entity in a social graph. The relationship between the consumer user and the commercial user may be represented by one or more edges between the user entity and business entity in the social graph.

The consumer-to-business service 110 may comprise a messaging system 140. The messaging system 140 may be generally arranged to receive, store, and deliver messages between individual entities such as individual users and collective entities such as businesses and other organizations. The messaging system 140 may store messages while messaging endpoints, such as messaging endpoint 125, are offline and deliver the messages once the messaging endpoints are available. The messaging system 140 may empower a user to use multiple messaging endpoints (e.g., a messaging client on a mobile device, a web browser on a personal computer) for the same user account, with the messaging system 140 keeping all of the messaging endpoints up-to-date as to the messaging state of the user account.

The consumer-to-business service 110 may comprise a social networking service 130. The social networking service 130 may maintain a social graph data structure representing a social graph. The social graph may represent relationships between entities, such as user entities, commerce entities, and any other sort of entity. The social graph may represent the relationships as graph relationships, in which all information is encoded as either being attached to a particular node in the graph or attached to a particular edge between two nodes in the graph. A messaging system 140 may be an element of a social networking service 130, with the social graph containing, at least in part, social-networking information. The whole of the consumer-to-business service 110 may be an element or composed of elements of a social networking service.

The consumer-to-business service 110 may comprise a consumer portal 150. The consumer portal 150 may be a unified entry point into the consumer-to-business service 110 for client applications being used by consumers. The consumer portal 150 may serve as a general user portal for non-commerce entities, including users that are not or do not engage in commerce using the consumer-to-business service 110. The consumer portal 150 may provide access to the messaging system 140 and the social networking service 130. In some embodiments, all access to the social networking service 130 may be mediated by the consumer portal 150 in which the information of the social networking service 130 is used and managed on behalf of the user without the user having direct access to some or all of the social graph information. In some embodiments, the user may have direct access to the messaging system 140 using their user account, with the consumer portal 150 limited to consumer functions of the consumer-to-business service 110 with general messaging functionality (e.g., messaging with friends) provided through direct network communication between the messaging endpoint 125 and the messaging system 140 without the mediation of the consumer portal 150.

The consumer-to-business service 110 may comprise a business portal 160. The business portal 160 may be a unified entry point into the consumer-to-business service 110 for client application being used by business entities. The business portal 160 may provide access to the messaging system 140 and the social networking service 130. In some embodiments, all access to the social networking service 130 may be mediated by a business portal 160 in which the information of the social networking service 130 is used and managed on behalf of the business entity without the business entity having direct access to some or all of the social graph information. In some embodiments, the business entity may have direct access to the messaging system 140 using their commerce account, with the business portal 160 limited to business functions of the consumer-to-business service 110 with general messaging functionality (e.g., messaging with customers) provided through direct network communication between one or more messaging bots 190 and the messaging system 140 without the mediation of the business portal 160.

A user may participate in the consumer-to-business messaging system 100 and interact with the consumer-to-business service 110 using a messaging endpoint 125 software application executing on a client device 120. The client device 120 may typically be a smartphone—a mobile phone capable of executing software applications that provide functionality beyond that of a conventional telephone—such as an iPhone®, Android® phone, or other smartphone. The messaging endpoint 125 may be specifically associated with a particular messaging system 140 that forms part of the consumer-to-business service 110 or may be a general-purpose messaging client operative to interact with a plurality of messaging services. The messaging endpoint 125 may interact with one or both of the consumer portal 150 and the messaging system 140 for the performance of messaging tasks and commerce tasks.

A business entity may be represented in a messaging system by a commerce representation comprising a collection of information for display to a user. A commerce representation may comprise a business page, the business page being the identity of a business within the consumer-to-business messaging system 100. The business page may display information regarding a business entity. The business page may include information for the business entity, such as one or more of a physical location for the business entity, the operating hours of the physical location, or the hours in which the business entity (e.g., a representative of the business entity) is available for messaging through the consumer-to-business messaging system 100. The business page may include social-networking information for the business entity, such as a list of friends of a viewing user that have "liked" or "followed" the business entity within a social network as may be represented in a social graph.

A commerce representation may not correspond precisely to a business entity. A single business entity, such as a business, may have multiple commerce representations and therefore multiple business pages. For example, a single business may have different representations for different brands owned and operated by the same business. A retailer or reseller may sell multiple brands and may have different representations for different brands that they sell. A business may have different representations for different geographic areas in which they operate, such as one business page for the United States, another for Europe, another for Russia, etc.

To aid a user in interacting with a service within a messaging context, services may be represented as messaging bots 190 within a messaging system. A messaging bot may be a fully or partially automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between more than two users.

A messaging bot for a commerce representation may be presented in a messaging conversation in a messaging system 140. A user of the messaging system 140 may interact with a business by messaging with the messaging bot that comprises a virtual representation of the business. A messaging bot may specifically correspond to a commerce representation presented as a business page, with the messaging bot being the representation of the business page in a messaging context. Messaging with the bot may therefore extend the presence of a commerce representation from a business page, primarily dedicated to providing information from the business to users, to interactive messaging in which users and the business can engage in a conversation.

A business may use one or more commerce applications to engage with the messaging system 140. An application may correspond to a specific registration empowering access to the messaging system 140 and/or social networking service 130 via an application programming interface (API). An application may be registered with the messaging system 140 via various registered hooks for the application specifying how the application can be contacted by the messaging system 140. These hooks may be used to contact the application in response to events, such as user messaging, within the messaging system 140. An application may be assigned a secure token that may be used for authentication and the secure (e.g., encrypted) reception and sending of information with the messaging system 140. An application may correspond to a specific AppID with the messaging system 140 and/or social networking service 130. Because the business may surface multiple aspects of the services and products it provides via the agent, multiple different applications may be used by a business entity to interact with a user via the messaging system 140. Each application may be subscribed with the messaging system 140 to the one or more commerce representations, such as business pages, that it powers.

The network 180 may comprise any form of computer network operative to carry computer transmissions between computer devices. The network 180 may include one or both of intranets and the Internet. The network 180 may include cellular data and/or Wi-Fi data networks, such as may be used to provide connectivity to a mobile client device 120.

The consumer-to-business messaging system 100 may use knowledge generated from interactions between users. The consumer-to-business messaging system 100 may comprise a component of a social networking service 130 and may use knowledge generated from the broader interactions of the social networking service 130. As such, to protect the privacy of the users of the consumer-to-business messaging system 100 and the larger social networking service 130, consumer-to-business messaging system 100 may include an authorization server (or other suitable component(s)) that allows users to opt in to or opt out of having their actions logged by the consumer-to-business messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the consumer-to-business messaging system 100 and other elements of a social networking service 130 through blocking, data hashing, anonymization, or other suitable techniques as appropriate. For example, while interactions between users of a social networking service 130 and the social networking service 130 may be used to learn media content preferences and the relationship between preferences for different pieces of content, these interactions may be anonymized prior to or as part of the learning process.

Figure 2:
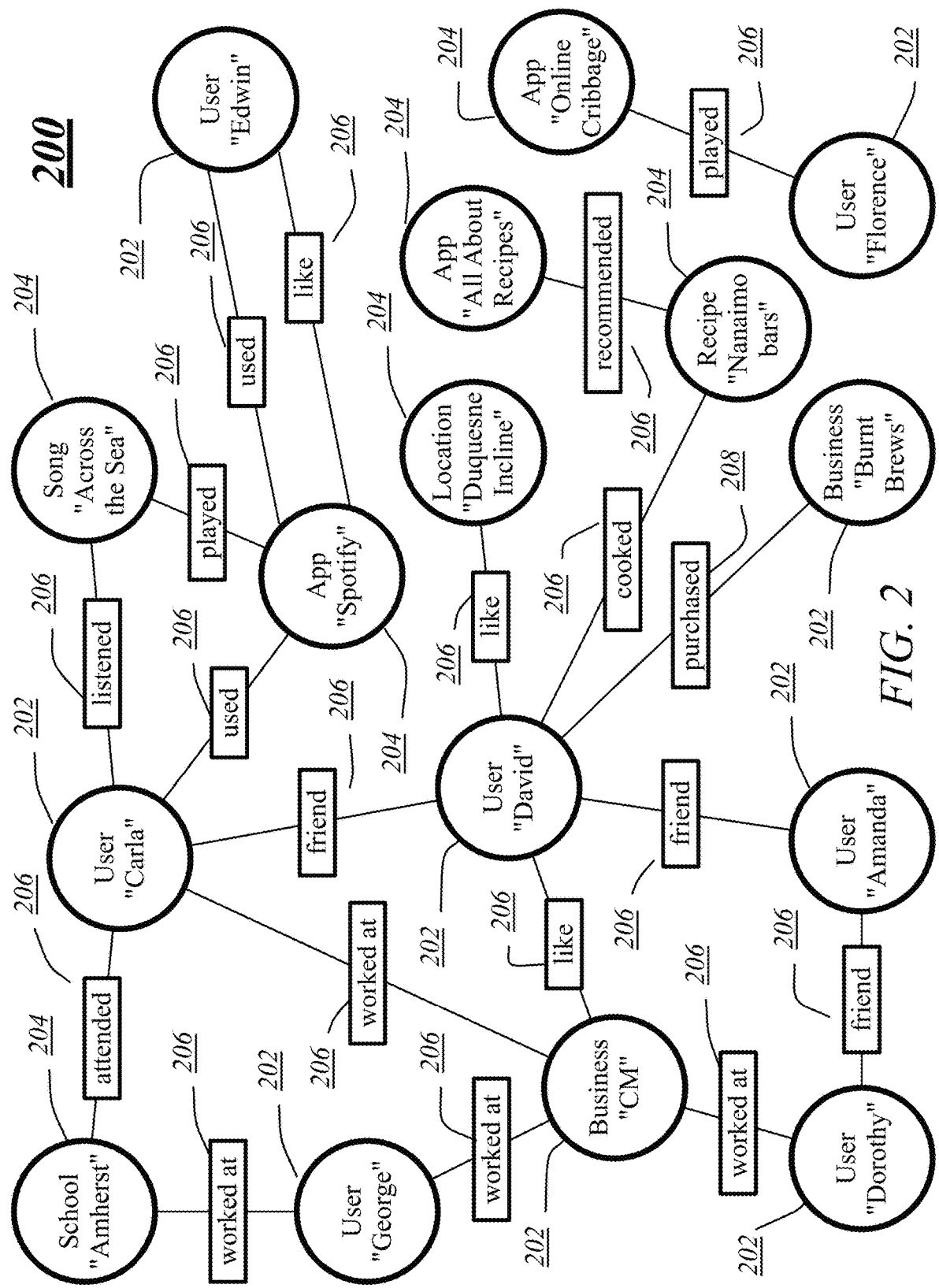
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
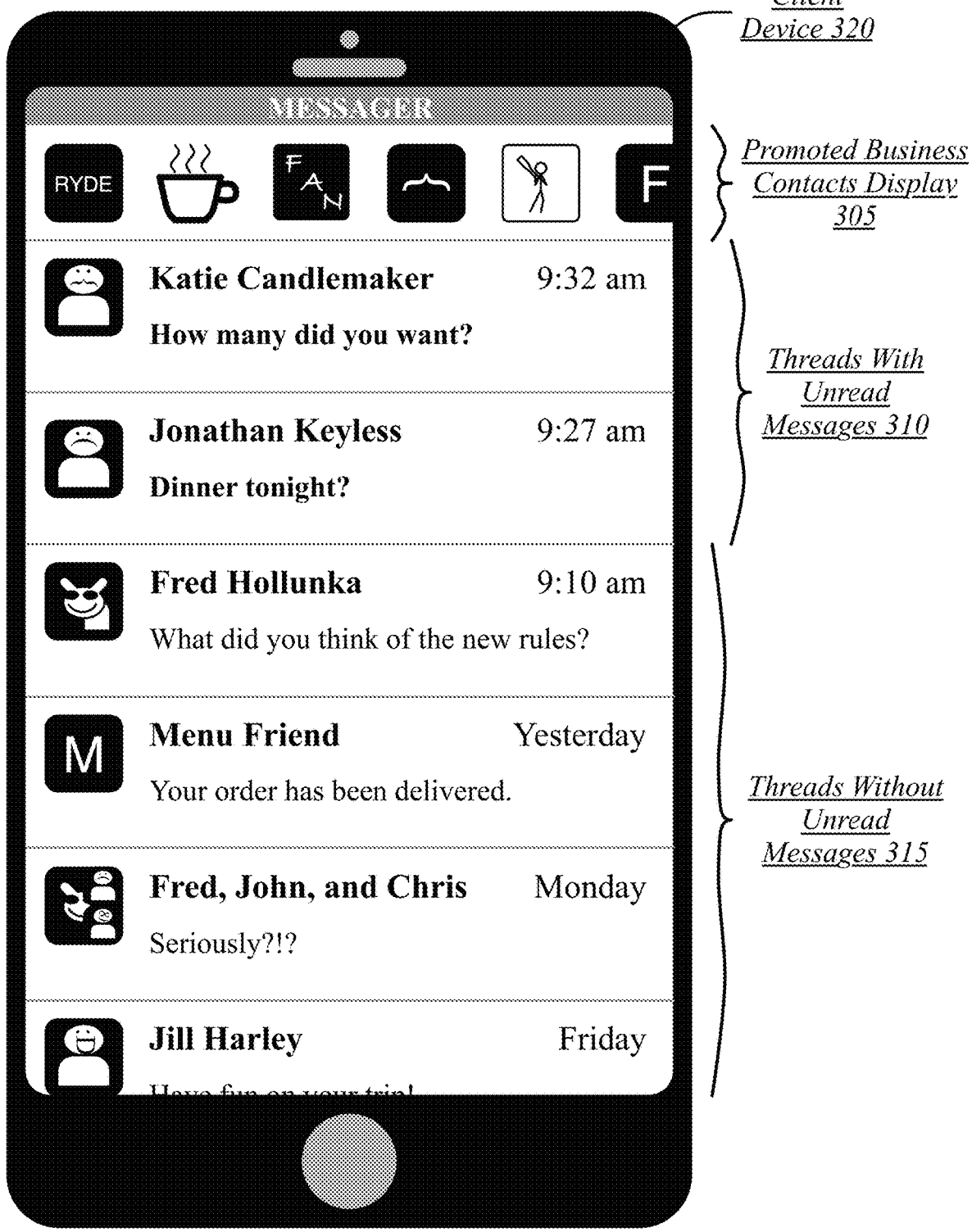
FIG. 3A illustrates an embodiment of a user interface with a promoted business contacts display.

FIG. 3A illustrates an embodiment of a user interface 300 with a promoted business contacts display 305.

A client device 320 may correspond to any device used to access a messaging system 100. While in the illustrated embodiment of FIG. 3A the client device 320 resembles a smartphone device, it will be appreciated that the techniques described herein may be used with any type of device. The user interface 300 may generally correspond to a display of a user inbox for the messaging system 140.

The user interface 300 may comprise a display of a plurality of threads in an inbox for a user account. A portion of displayed threads may be threads with unread messages 310. A portion of displayed threads may be threads without unread messages 315. The threads with unread messages 310 may be displayed with a higher prominence than the threads without unread messages 315, such as by placing them in a more prominent position. In the illustrated embodiment of FIG. 3A, the user interface 300 may be scrolled downwards to reveal more threads.

The threads with unread messages 310 may be displayed in a higher position than the threads without unread messages 315, with additional threads without unread messages 315 being viewable by scrolling downwards. In some cases, sufficient threads with unread messages 310 may exist that the threads without unread messages 315 are only visible by scrolling downwards, with the threads with unread messages 310 being sufficient in number to take up all the available screen space in an initial display of an inbox. The display of threads in an inbox may comprise, for each thread, a display of a name of a thread, a last-received or last-exchanged messages in the thread, a preview of the contents of the thread, and an avatar for one or more users in the thread. The name of the thread may correspond to the name(s) of one or more participants in the thread other than the name for the user account for the inbox.

The user interface 300 for the messaging inbox may include a promoted business contacts display 305. The promoted business contacts display 305 may comprise a plurality of display elements, wherein each display element corresponds to a business contact. The promoted business contacts display 305 may be displayed in a high-prominence area of an inbox, such as the top of a display of the inbox. The promoted business contacts display 305 may be displayed in an initial view of the inbox. The initial view of the inbox may be the view reached when loading a messaging client. The initial view of the inbox may be the view reached when selecting an inbox view control in the messaging client.

The promoted business contacts display 305 may include a display for one or more messaging bots, with the selection of a display for a messaging bot initiating a one-on-one communication with the messaging bot via a messaging system 140. For instance, in a messaging system 140, the selection of the display for the messaging bot may select or instantiate a one-on-one thread with the messaging bot. Where the one-on-one thread already exists with the messaging system 140, the thread may be selected and displayed, such as may include at least a portion of the messaging history in the message thread. Where the one-on-one thread doesn't already exist, such as where the selecting user and the messaging bot haven't previously messaged, the thread may be created and displayed. In a voice communication system, a voice call may be initiated or offered for initiation. In a video communication system, a video call may be initiated or offered for initiation. A display for a messaging bot may comprise an avatar for the messaging bot (e.g., a business logo), a display of a name for a messaging bot, or any other identifying information.

In some cases, a promoted business contacts display 305 may be displayed for promoting two-way interactive messaging with a messaging bot, such as for the receipt of services from a business represented by the messaging bot. In other cases, a promoted business contacts display 305 may be displayed for promoting one-way messaging subscriptions with a messaging bot, such as for the receipt of news and media from a business represented by the messaging bot. In some cases, a pair of promoted business contacts displays may be used and displayed in a messaging client: a business commerce promoted business contacts display promoting two-way interactive messaging with messaging bots and a subscription promoted business contacts display one-way messaging subscriptions with messaging bots. In some cases, a single messaging bot may be used for both one-way and two-way engagement, such as using the same messaging bot for purchasing media and receiving free media through a subscription, with these multi-functionality messaging bots being displayed in either or both of one-way and two-way promoted business contacts displays. In some cases, individual contacts, such as friends of the user with a messaging system 140, may be promoted for messaging, which may be displayed in combination with one or more displays of promoted business contacts.

In some cases, a promoted business contacts display 305 may include performance information for the one or more promoted business contacts. Performance information may include a display of an average response time for the business, such as may be determined according to analysis of the actual performance of a messaging bot.

Figure 3B:
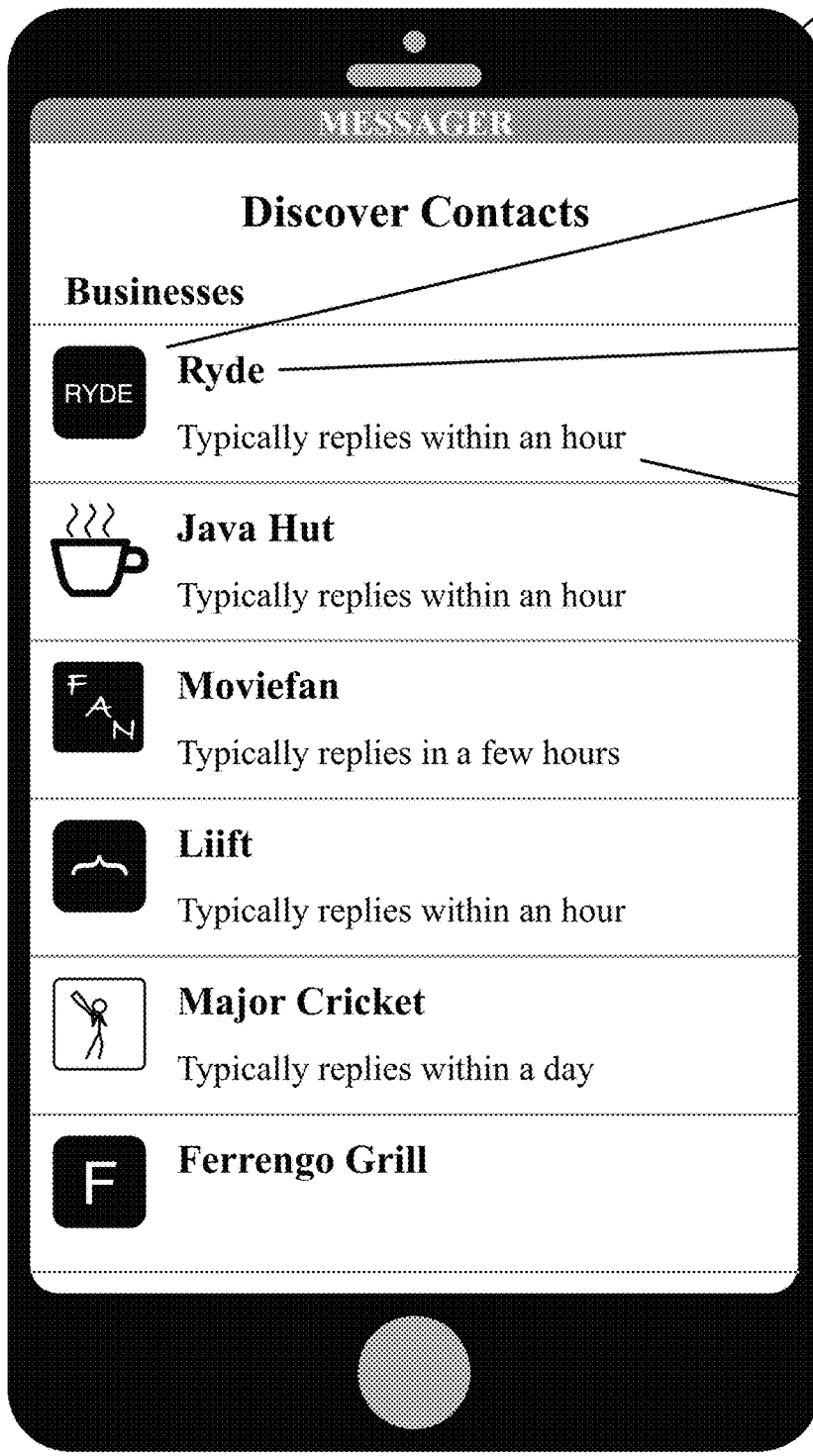
FIG. 3B illustrates an embodiment of a user interface with a business contact discovery display.

FIG. 3B illustrates an embodiment of a user interface 325 with a business contact discovery display.

A business contact discovery display may correspond to a discovery interface for a messaging client. A discovery interface may empower a user to discover business contacts and/or personal contacts within a messaging client. A discovery interface may correspond to a discovery tab within the messaging client of a plurality of interface tabs. A discovery interface may be displayed in combination with other interfaces. For example, a search interface may default to a display of suggested contacts, with the suggested contacts presented as the default suggestions, that may be replaced or refined based on search information entered by the user.

A business contact discovery display may comprise a plurality of suggested business contacts 330. The suggested business contacts 330 may comprise a plurality of entries, each comprise a suggested business contact. The suggested business contacts 330 may each be a business contact suggested to a user. A business contact may be selected for suggestion to a user based on a variety of factors. Business contacts may be suggested for messaging and/or subscription. Business contacts may be selected and/or ranked based on user information, contextual information, and/or promotional consideration.

A display of a suggested business contact may comprise business contact information. Business contact information may include a business contact name 335, the business contact name 335 representing the name of a business entity for the business contact. Business contact information may include a business contact icon 340, the business contact icon 340 comprising an avatar, logo, or other icon representing the business.

Business contact information may include a business typical reply time 345. A business typical reply time 345 may comprise an average, typical, predicted, or other reply time associated with a business contact. The business typical reply time 345 may be determined based on performance information generated about the business contact. The consumer-to-business messaging system 100 may record the reply times for a business contact and use the recorded reply times to generate the business typical reply time 345. The reply time may comprise the amount of time between a user sending a message to the business contact and the user receiving a reply to the message.

The business typical reply time 345 may correspond to an initial reply time for the business contact replying to an initial message from a user, which may communicate the performance a user would experience in their initial engagement with a business in a messaging interaction. The business typical reply time 345 may correspond to an overall reply time for the business contact replying to any message from a user, which may communicate the performance a user would experience in their relationship with a business through a messaging interaction. Some business contacts may lack a typical reply time, such as where insufficient information has been collected to generate one, or the collected information on reply time is sufficiently varied that there is no reply time for the business contact that could accurately be called typical.

The communication of a business typical reply time 345 may serve to encourage users to engage with businesses with superior reply times, and may therefore reward businesses with superior reply times. In some embodiments, the selection and/or ranking of the suggested business contacts 330 may include the reply times, with the selection and/or ranking of the suggested business contacts 330 preferencing the selection and/or a higher ranking for businesses with a better (i.e., shorter) reply time.

Figure 4:
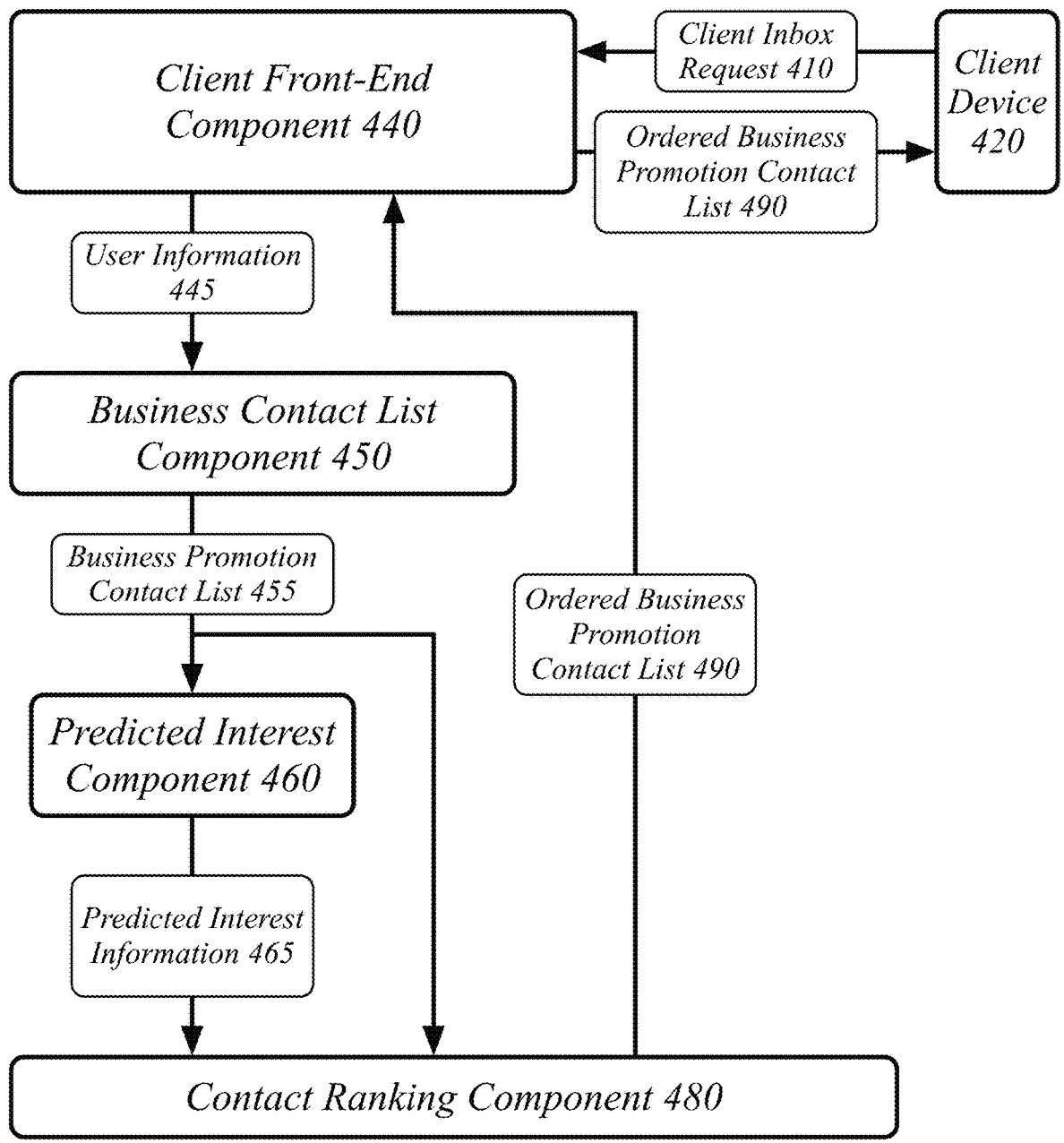
FIG. 4 illustrates an embodiment of a consumer-to-business messaging system processing a client inbox request.

FIG. 4 illustrates an embodiment of a consumer-to-business messaging system 100 processing a client inbox request 410.

The consumer-to-business messaging system 100 may comprise a plurality of components. The consumer-to-business messaging system 100 may be operative to provide an ordered business promotion contact list 490 to a client device 420. The ordered business promotion contact list 490 may configure the client device 420 for display of the promoted business contacts according to ranking weights, the ranking weights determined according to a function including a predicted business messaging interest representing a prediction of a user's interest in messaging with the suggested business contacts.

The consumer-to-business messaging system 100 may comprise a client front-end component 440. The client front-end component 440 may be generally arranged to exchange information with client devices to empower the client devices to engage in messaging activity using a messaging system 140. The client front-end component 440 may provide access to various messaging services and/or social networking services. The client front-end component 440 may provide access to the retrieval of a messaging inbox. The client front-end component 440 may provide an ordered business promotion contact list 490 to a client device 420. The retrieval of a messaging inbox may include the retrieval of the ordered business promotion contact list 490 automatically or the ordered business promotion contact list 490 may be performed via a distinct client inbox request 410.

The client front-end component 440 may receive a client inbox request 410 for a user account from a client device 420. The user account may be an account registered with a messaging system 140. A client inbox request 410 may be a request for updates to an inbox. Alternatively, a client inbox request 410 may be distinct from a request for updates to an inbox. In some embodiments, a request for an ordered business promotion contact list 490 may be sent in coordination with a request for updates to an inbox so as to empower the display of the ordered business promotion contact list 490 in association with an inbox.

The client front-end component 440 may transmit an ordered business promotion contact list 490 to the client device 420 in response to the client inbox request 410. The ordered business promotion contact list 490 may be ordered for display for the user account based on a determined ranking weight for each business contact on the ordered promotion contact list 490. The ordered business promotion contact list 490 may be ordered for display to the user account in association with a messaging interface for the messaging system 140.

Each business contact on a business promotion contact list 455 and ordered business promotion contact list 490 may be associated with a business page comprising business information with the messaging system 140. Each business contact on the business promotion contact list 455 and ordered business promotion contact list 490 may be operative to open a message thread with the business contact when selected, such as by being associated with a control for opening the message thread.

In some cases, a client device 420 may engage in a business contact search. The client front-end component 440 may interact with the client device 420 to support the business contact search. The client front-end component 440 may suggest responses to the business contact search. The client front-end component 440 may interact with the client device 420 to order a type-ahead for a search entry form for the messaging system 140 based on the ranking weight. The results for a business contact search may include performance information for the one or more discovered business contacts. Performance information may include a display of an average response time for the business, such as may be determined according to analysis of the actual performance of a messaging bot by the messaging system 140.

The consumer-to-business messaging system 100 may comprise a business contact list component 450. The business contact list component 450 may be generally arranged to retrieve and manage contact information for a user account. The contact information may include both user contacts (other non-business users of the messaging system 140) and business contacts. The business contact list component 450 may be operative to determine a business promotion contact list 455 for the user account. The business contact list component 450 may receive user information 445 from the client front-end component 440 identifying the user account for a client device 420. For instance, the user information 445 may comprise a user identifier uniquely identifying the user account within the consumer-to-business messaging system 100.

The business contact list component 450 may determine a business promotion contact list 455 for the user account. The business contact list component 450 may exclude recently-active business contacts from the business promotion contact list 455. Recently-active business contacts may comprise business contacts with which the user has engaged in messaging interactions within a predefined time period, within a predefined recency. Recently-active business contacts may comprise a predefined number of the most-recent business contacts with which the user has engaged. These techniques may be combined.

A user account may be associated with one or more friends with a messaging system 140. In some embodiments, a user's friends with a messaging system 140 may correspond to or include a friends list for a social networking service. A user's friends may also include contacts specifically with the messaging system 140.

A business promotion contact list 455 may be generated based on the business messaging patterns for a user and/or a user's friends. The business promotion contact list 455 for the user account may incorporate business contacts from a variety of sources. The business promotion contact list 455 for the user account may incorporate a list of business contacts the user account has messaged with via the messaging system 140. The business promotion contact list 455 for the user account may incorporate a list of business contacts the user account has liked with the messaging system 140. The business promotion contact list 455 for the user account may incorporate a list of business contacts the friends of the user account have messaged with via the messaging system 140. The business promotion contact list 455 for the user account may incorporate a list of business contacts the friends the user account have liked with the messaging system 140. The business promotion contact list may comprise a joining of one or more of these sources and may include business contacts from additional or alternative sources.

The business promotion contact list 455 may be generated by forming a core corpus of business contacts and then expanding the corpus to include additional business contacts similar to the contacts from the starting corpus. The business contact list component 450 may start by generating a seed business promotion contact list for the user account. The seed business promotion contact list may be based on a list of business contacts the user account has messaged with via the messaging system 140. The seed business promotion contact list may additionally or alternatively be based on a list of business contacts the friends of the user account have messaged with via the messaging system 140. The business contact list component 450 may receive user information 445 comprising a list of business contacts the user account has been used to message with via the messaging system 140 and/or a list of business contacts the friends of the user account have messaged with. This list, or a joining of these lists, may comprise the initial corpus of business contacts.

The business contact list component 450 may then expand the seed business promotion contact list to generate the business promotion contact list 455. The business contact list component 450 may include additional business contacts with similar features to the business contacts on the seed promotion contact list. Each business contact may have features, such as may be defined according to a social graph for a social networking service 130. Business contacts may be connected based on having similar features. The weight of features—their importance in creating connections—may be determined based on machine-learning clustering of business contacts. In some cases, this clustering may be specific to particular demographics, such that different clusterings or different connections between business contacts are used for different groups of people. A machine learning component may determine feature weights for expanding the seed business promotion contact list based on a machine learning analysis of a messaging history for the messaging system 140. The business contact list component 450 may expand the seed business promotion contact list based on the feature weight. In some embodiments, the feature weights may be general across all users of the messaging system 140. In other embodiments, the feature weights may be selected as corresponding to particular profile information for the user, such as may include age, gender, location (e.g., city, state, country, or other region), or other information known about a user.

The consumer-to-business messaging system 100 may comprise a predicted interest component 460. The predicted interest component 460 may be generally arranged to determine predicted interest information 465 for a user in relation to business contacts based on user information for users of the consumer-to-business messaging system 100. The user information may comprise social-networking information for a social networking service 130, such as may derived from a social graph 200. The predicted interest component 460 may generate predicted interest information 465 for the user and provide the predicted interest information 465 to the contact ranking component 480. The predicted interest information 465 may be generated according to known techniques for generating predicted interest. The predicted interest component 460 may be operative to determine a predicted communication interest for each business contact on the promotion contact list 455 for the user account.

Machine learning may be used to determine a user's predicted business messaging interest for each business contact. A messaging history for a messaging system may be used to match profile features for users to business features for businesses to predict a user's interest in messaging with a business contact. A predicted interest component 460 may receive one or more business features for each business contact on the business promotion contact list and receive one or more profile features for one or more users of the messaging system 140. The predicted interest component 460 may receive a messaging history for the messaging system, with the messaging history comprising historical information about various users engagement with businesses via the messaging system 140. The predicted interest component 460 may generate a predicted business messaging interest model for the messaging system based on a machine learning analysis of the messaging history, with the predicted business messaging interest model based on the one or more profile features and the one or more business features. The predicted interest component 460 may thereafter determine the predicted business messaging interest for each business contact on the business promotion contact list based on the predicted business messaging interest model.

In some cases, a predicted commerce communication interest may be used to generate suggested business contacts for engaging in two-way commerce interactions. In some cases, a predicted subscription communication interest may be used to generate suggested business contacts for engaging subscriptions. These cases may be used alternatively or in combination, with only one type of suggestions being presented to a user for a client device 420 or both types of suggestions being presented.

Different aspects of commercial engagement may be predicted. A predicted business messaging interest model may predict user interest in beginning a messaging interaction with a business, such as opening a message thread with a messaging bot and/or sending a message to a messaging bot via the message thread. A predicted business messaging interest model may predict user interest in requesting a service via the messaging interaction with the business. A predicted business messaging interest model may predict user satisfaction from requesting the service via the messaging interaction with the business, such as may be determined based on user feedback. Each of these measures may be tracked for users of the consumer-to-business messaging system 100. These measures may be matched to user information for a user account—such as biographical information, contextual information, and/or interest information—using machine learning techniques to determine predicative user features for one or more of the measures, as represented in the predicted business messaging interest model. In some embodiments, a single measure may be used for a user's interest. In some embodiments, the measures may be combined to generate an overall interest. This model may then be applied to the user information for a user account to generate the predicted interest information 465 for the user account.

Different aspects of subscription engagement may be predicted. A predicted business messaging interest model may predict user interest in subscribing with a business, as measured by user subscriptions. A predicted business messaging interest model may predict user time spent reading subscription messages from the business, as measured by time spent in a messaging client in the message thread for the messaging bot. A predicted business messaging interest model may predict user responsiveness to subscription notifications for the business, such as the frequency and speed with which users respond to notifications delivered for received subscription messages. A predicted business messaging interest model may predict user blocking of the business, with this measure taken as a negative indication for the messaging bot. Each of these measures may be tracked for users of the consumer-to-business messaging system 100. These measures may be matched to user information for a user account—such as biographical information, contextual information, and/or interest information—using machine learning techniques to determine predicative user features for one or more of the measures, as represented in the predicted business messaging interest model. In some embodiments, a single measure may be used for a user's interest. In some embodiments, the measures may be combined to generate an overall interest. This model may then be applied to the user information for a user account to generate the predicted interest information 465 for the user account.

Promoted business contacts may be generated with information received from outside the messaging system 140. A messaging history may include one or more of a short message service (SMS) messaging history and a phone record history. The predicted interest component 460 may generate a predicted business messaging interest model for the messaging system 140 based on a machine learning analysis of the messaging history and a web contact history. The predicted business messaging interest model may, for instance, recommend businesses or types of businesses that a user has previously SMS messaged or called.

A machine learning model may be used once a messaging history for messaging bot engagement has been established.

However, during an initial period for the consumer-to-business messaging system 100 the suggestions may instead be based on heuristics. This initial period may be used to build a messaging history for messaging bot engagement, allowing for a transition to a machine learning model.

A heuristic may provide the predicted business messaging interest for each business contact on the business promotion contact list 455. The predicted business messaging interest may be based on a business responsiveness rate, a business responsiveness speed, and a friend engagement measure for each business contact. The business responsiveness rate may be a measure of what percentage of the user messages sent to a messaging bot are responded to by the business. The business responsiveness speed may comprise a measure, such as an average, of the time between the sending of user messages and the response by the messaging bot where a response is received. The friend engagement measure may comprise a measure of whether friends for the user account on the messaging system 140 have liked the business contact with the messaging system 140. Alternatively or additionally, the friend engagement measure comprising a measure of whether friends for the user account on the messaging system 140 have messaged with the business contact via the messaging system 140. Where the friend engagement measure comprises a measure of whether friends for the user account have messaged with the business contact, a particular degree of messaging engagement may be used, such as any engagement at all (sending any message whatsoever to the messaging bot) or actually engaging the messaging bot in a service, without limitation.

The predicted business messaging interest may specifically be based on a linear function of the business responsiveness rate, the business responsiveness speed, and the friend engagement measure for each business contact. The linear function may be determined based on a linear regression of a historical data set for the messaging system. Initially, the linear function may be manually configured. The consumer-to-business messaging system 100 may then switch to the use of a historical data set once user interactions have been gathered. The use of heuristics with an early historical data set may be used to transition from a hand-tuned predicted business messaging interest generation to a model in which linear regression is used to tune parameters of a linear function and then ultimately to a full machine-learning system. The linear function may be trained on the historical data set to select and score highly those business contacts that users eventually engage with. Machine learning may determine weights for the business responsiveness rate, the business responsiveness speed, and the friend engagement measure prior to the user engaging with the business contact that maximize the accuracy of predicting the eventual engagement by the user.

In some cases, a predicted business messaging interest model may be additionally based on a user context. This user context may comprise a current user location. For instance, nearby businesses may be suggested for messaging. Alternatively or additionally, businesses relevant to the user's current location may be suggested. For example, a user at an airport may be suggested taxi, ride sharing, or other local transportation options. In some embodiments, machine learning may include a current user context when learning what businesses to recommend, such that businesses receive an increased ranking weight when a location that is learned to be relevant to the businesses is present in the user context. In some embodiments, types of businesses may be manually or automatically configured to receive a higher ranking weight in certain locations, such as local transportation options when at an airport, train station, or other long-distance transportation location.

A contact ranking component 480 may determine a ranking weight for each business contact on the business promotion contact list 455 based on the predicted business messaging interest for each business contact. In some cases, the predicted business messaging interests may each comprise a numerical score, this numerical score used as the ranking weight. However, in some cases, the ranking weight may be reduced for one or more previously-viewed business contacts of the business promotion contact list. The ranking weight may be reduced for the one or more previously-viewed contacts by a linear multiplier based on a number of viewings. The contact ranking component 480 may track the number of times a contact is included in a business promotion contact list 455 and use this number as the number of viewings. Alternatively, the client device 420 may track the number of times a promoted business contact is actually displayed to the user and provide it to the consumer-to-business messaging system 100 for use as the number of viewings. The contact ranking component 480 may order the business promotion contact list 455 for display for the user account based on the determined ranking weight for each business contact on the business promotion contact list to generate the ordered business promotion contact list 490.

In some embodiments, other information about a contact may be incorporated into the ranking weight. The consumer-to-business messaging system 100 may increase the ranking weight for a business contact based on a short messaging service (SMS) history for the user account indicating short messaging service messaging with the business contact. In some cases, the predicted interest component 460 may increase the predicted interest based on the SMS history. Additionally or alternatively, the ranking weight may receive an additive or multiplicative boost based on the existence of a SMS history between the user and the business contact. This may serve to promote transition from the use of SMS to the use of messaging using a messaging system 140.

Figure 5:
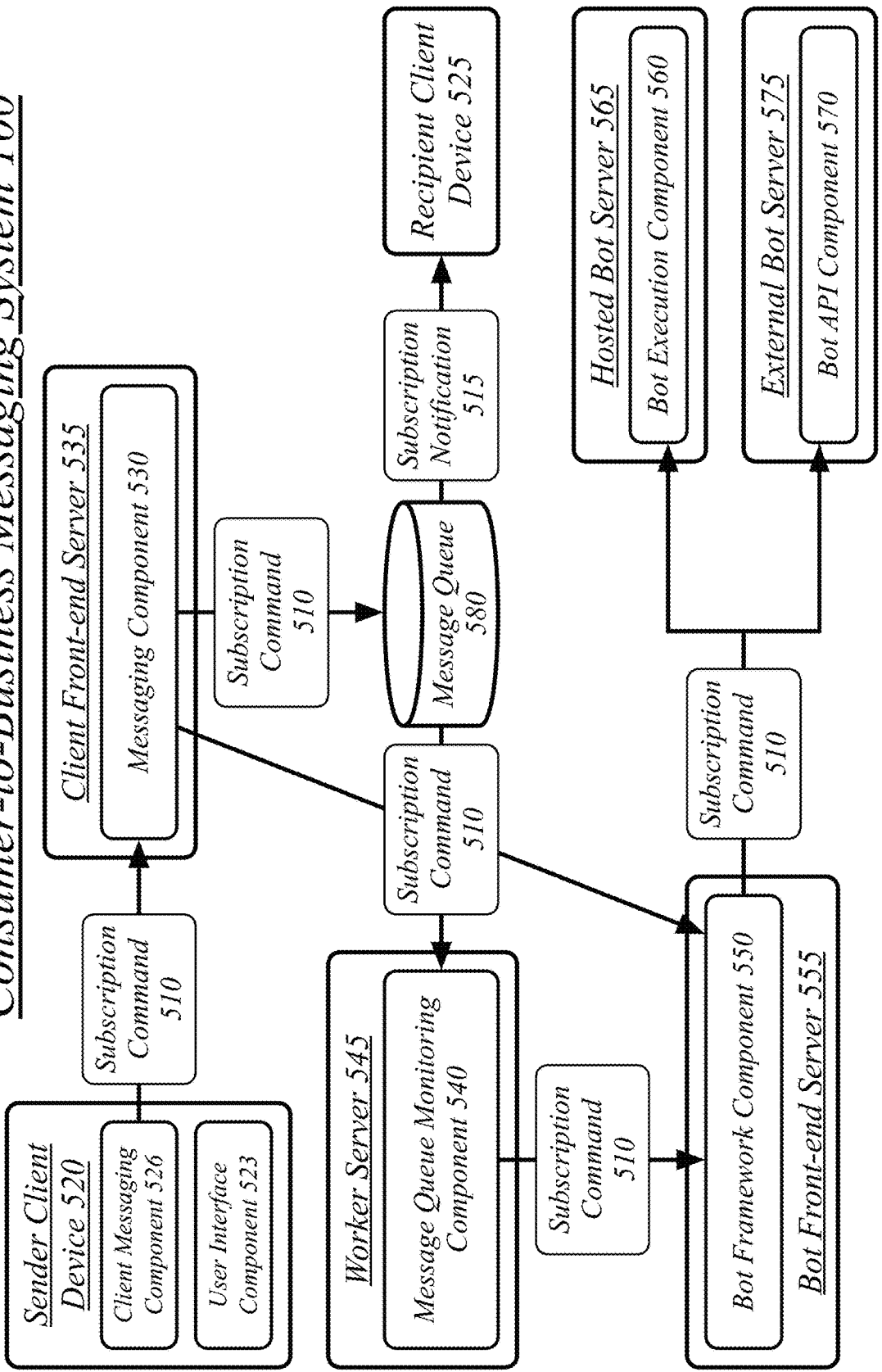
FIG. 5 illustrates an embodiment of a subscription command in a consumer-to-business messaging system.

FIG. 5 illustrates an embodiment of a subscription command 510 in a consumer-to-business messaging system 100.

A messaging system 140 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers through network communication. For example, the messaging client transmitting or receiving messages to or from a client front-end server 535 may be interpreted as using the network interface controller for network access to a communications network for the transmission or reception of information.

A messaging client may comprise a user interface component 523. A user interface component 523 may be generally arranged to display user interfaces to a user of a client device and to receive user commands for the messaging client for the client device. A messaging client may comprise a client messaging component 526. A client messaging component 526 may be generally arranged to conduct messaging interactions on the behalf of the messaging client via communication with the client front-end server 535.

A client front-end server 535 may be generally arranged to act as a network access point to the messaging system 140 for client devices such as sender client device 520. The client front-end server 535 may comprise a messaging component 530, the messaging component 530 generally arranged to act as a network access point to messaging services for the messaging system 140. The messaging component 530 may receive messages from client devices and add the messages to message queues.

A message queue 580 may be specifically associated with the user of sender client device 520, such as by being uniquely associated within the messaging system 140 with a user account for the user of sender client device 520. The message queue 580 may be a single queue used for all messaging endpoints used by this user. The message queue 580 may comprise a representation of updates in a strict linear order. The message queue 580 may be organized as a data unit according to a variety of techniques. The message queue 580 may be stored in semi-persistent memory, persistent storage, both semi-persistent memory and persistent storage, or a combination of the two. The message queue 580 may be organized according to a variety of data structures, including linked lists, arrays, and other techniques for organizing queues. The message queue 580 may generally comprise a first-in-first-out (FIFO) queue in which no update will be removed or retrieved from the queue before any updates that were received prior to it.

The messaging system 140 may comprise a worker server 545. In general, the messaging system 140 may comprise a plurality of worker servers that may be assigned to various tasks. A worker server 545 may comprise a message queue monitoring component 540, the message queue monitoring component 540 arranged to monitor updates, such as may comprise messages, in the message queue 580 and other message queues of the messaging system 140 for various flags, indicators, and other information.

The messaging system 100 may comprise a bot front-end server 555. A bot front-end server 555 may act as an access point to messaging bot services for the consumer-to-business messaging system 100. The bot front-end server 555 may act as an intermediary between the servers of the messaging system 140 and one or more internal and/or external bot execution servers. The bot front-end server 555 may comprise a bot framework component 550 generally arranged to provide an accessible framework to the messaging bot system.

In some cases, messaging bots may be executed by servers external to the consumer-to-business messaging system 100, such as an external bot server 575 operated by the service associated with the bot. The bot framework component 550 may determine an external bot server 575 for the service associated with the messaging bot. The bot framework component 550 may submit messages to the messaging bot by sending the messages to the external bot server 575 associated with the messaging bot. In some embodiments, submitting messages may comprise extracting message content and transmitting the message content to the external bot server 575 using a bot server interaction application programming interface (API). Bot messages from the messaging bots may similarly be received by the bot framework component 550 from an external bot server 575.

In other cases, messaging bots may be executed by the servers of the consumer-to-business messaging system 100. The bot framework component 550 may determine a hosted bot server 565 for the service associated with a messaging bot. A hosted bot server 565 may comprise a bot server maintained by the provider of the consumer-to-business messaging system 100. The bot framework component 550 may submit messages to the messaging bot by sending the messages to the hosted bot server 565 associated with the messaging bot and may receive messages from the messaging bot by receiving them from the hosted bot server 565.

Users of the consumer-to-business messaging system 100 may be empowered to subscribe message threads to bots to be pushed updates from the bots. In some cases, a subscribed message thread may be a user-to-bot message thread particular for the user to that messaging bot. In other cases, a user-to-user message thread, including both message threads between a pair of users and group message threads, may be subscribed to messaging bots. A subscription to a bot may authorize the bot to transmit messages to the subscribed message thread. This authorization may have restrictions, such as having a limited number of subscription messages that may be sent within a given time period. For example, a messaging bot may be restricted to sending at most one message a day or a specific number of messages a day. In some embodiments, subscriber thread preferences for a user may specify a restriction on the frequency with which a messaging bot may message a message thread.

A subscription command 510 may instruct a messaging system 140 and the messaging bot that the message thread associated with the message subscription command 510 should receive subscription messages from the messaging bot. A bot framework component 550 may subscribe the message thread to the messaging bot in response to the bot subscription command 510. In various embodiments, the subscription command may be transmitted directly from the client messaging component 526 to the bot framework component 550, may be transmitted directly from the messaging component 530 to the bot framework component 550, or may be detected in the message queue 580 and thereby communicated to the bot framework component 550.

The subscription command 510 may also be received by a recipient client device 525, such as every recipient client device for users involved in the message thread subscribed by the subscription command 510. The subscription command 510 may be communicated to a recipient client device 525 as a notification in the message thread that the message thread has been subscribed to the messaging bot. In general, any member of a message thread may subscribe the thread to a messaging bot, unsubscribe the thread from the messaging bot, or modify the subscriber thread preferences for the message thread's subscription to the messaging bot. Any of these actions may result in a notification message being added to the message queue for each member of the message thread, the notification message communicating the action, whether subscription, unsubscription, or modification of subscriber thread preferences.

Subscriptions may be maintained in a subscription registry. A subscription registry may map between thread identifiers that uniquely identify message threads within the messaging system 140 and subscriptions to messaging bots. A subscription registry may comprise, without limitation, a database or database table with a row for each registered subscription. Each registered subscription may be associated with subscriber thread preferences for that subscription.

A messaging component 530 may receive a bot subscription command 510 for a user account with a messaging system 140 from a sender client device 520, the bot subscription command specifying a messaging bot. The bot subscription command may be received based on a bot recommendation interface displayed on the sender client device 520 in a user interface component 523. A bot recommendation interface may comprise a plurality of business contacts in a business promotion contact list. The business promotion contact list may be configured based on a predicted business messaging interest model, wherein the predicted business messaging interest model predicts one or more of user interest in subscribing with a business, user time spent reading subscription messages from the business, user responsiveness to subscription notifications for the business, user unsubscribing for channels for the business, and user blocking of the business.

A bot subscription command 510 may be received in association with an information display associated with the messaging bot in a news feed interface. A social networking service 130 may provide a news feed to users of the service, the news feed comprising news feed items. News feed items may be generated based on status changes, postings, and other information generated by users of the social networking service 130. In some cases, users may post content received based on a subscription to the social networking service 130, with the service possibly thereafter adding the content to the news feeds of one or ore friends of the user in the service. The posted content may be associated with a display indicating the messaging bot, and possibly in addition the interest for the messaging bot, that brought the posted content to the attention of the posting user via a subscription. This display may include a control empowering the user to subscribe to the messaging bot directly from the news feed, which may result in the subscription command 510.

A bot subscription command 510 may be received in association with a web page display associated with the messaging bot. A user may view a web page for an article. The article may be associated with the messaging bot by virtue of comprising content that may also be delivered by the messaging bot. The web page may advertise that the messaging bot is available for receiving content such as the article, and may include a web plugin comprising a control empowering subscription to the messaging bot. In some cases, an article may be reached via a news feed, such as by appearing as an item in a news feed, being selected by the user, with the user then directed to a web page display for the article. Where an article is reached via a news feed, the web page display may include a header, footer, frame, or other visual element for the social networking service 130. This header, footer, frame, or other visual element may include a display of a messaging bot is available for receiving content such as the article or that the messaging bot is responsible for the posting user having added the article to the news feed. A control may be associated with this display empowering the user to subscribe to the messaging bot directly from the news feed, which may result in the subscription command 510. In some cases, the messaging bot channel may be determined as a broadcast channel associated with the web page display.

The bot framework component 550 may determine a messaging bot channel for the messaging bot. The messaging bot channel may correspond to an interest of a plurality of interests support by the messaging bot. In some cases, the messaging bot channel may be automatically determined as a default messaging bot channel for the messaging bot, with the user then able to select what one or more interests for the messaging bot they want to subscribe to. For example, a user may deselect their subscription to the default messaging bot channel and select one or more other messaging bot channels for their subscription.

A user may be able to configure the interests that they want to subscribe to. The bot framework component 550 may receive a bot subscription command 510 for the user account, subscribe the user account to the messaging bot channel for the messaging bot in response to the bot subscription command 510, and send a subscription configuration package to the client device for the user account. The subscription configuration package may comprise a listing of a plurality of messaging bot channels for the messaging bot, the subscription configuration package operative to configure the client device for the selection of one or more selected messaging bot channels of the plurality of messaging bot channels. The user may be displayed a list of the messaging bot channels available for a messaging bot and to select one or more of the channels for subscription. The bot framework component 550 may determine the messaging bot channel for the messaging bot based on the one or more selected messaging bot channels.

The subscription configuration package may be for display during an initial display of a messaging bot thread for the messaging bot. For instance, a user subscribing to the messaging bot from a news feed or web page display may be subscribed and sent the subscription configuration package. The client device 520 for the user may receive the subscription configuration package and instantiate a message thread for the messaging bot in the messaging client. The messaging client may display the messaging bot channel options when the message thread is selected on the client device 520.

Users may be empowered to block messaging bots that they have subscribed to. The messaging component 530 may receive a block command in association with the user account for the messaging bot and block communication from the messaging bot for the user account. Because the messaging bot is blocked, the user may no longer receive content from the messaging bot. As such, the bot framework component 550 may unsubscribe the user account from any messaging bot channel for the messaging bot in response to the block command.

The consumer-to-business messaging system 100 may attempt to avoid supporting messaging bots that result in as drastic a user action as blocking the bot, rather than merely unsubscribing from the bot. The bot framework component 550 may determine a block rate for the messaging bot and flag the messaging bot for review when the block rate exceeds a predefined threshold. A moderator of the consumer-to-business messaging system 100 may be presented with information for the messaging bot, including one or more of the block rate, subscription rate, unsubscription rate, and sample bot messages.

Users may also unsubscribe from a bot. A user unsubscribing from a messaging bot may be a negative sign of the value of the messaging bot to subscribers, but a less drastic one than blocking. As such, it may be incorporated as a negative measure, but at a less negative weight than blocking. The bot framework component 550 may receive a bot unsubscription command for the user account, the bot subscription command specifying the messaging bot and the messaging bot channel, and unsubscribe the user account from the messaging bot channel for the messaging bot in response to the bot unsubscription command. The bot framework component 550 may record the bot unsubscription command in an unsubscribing history for a machine learning model.

Figure 6:
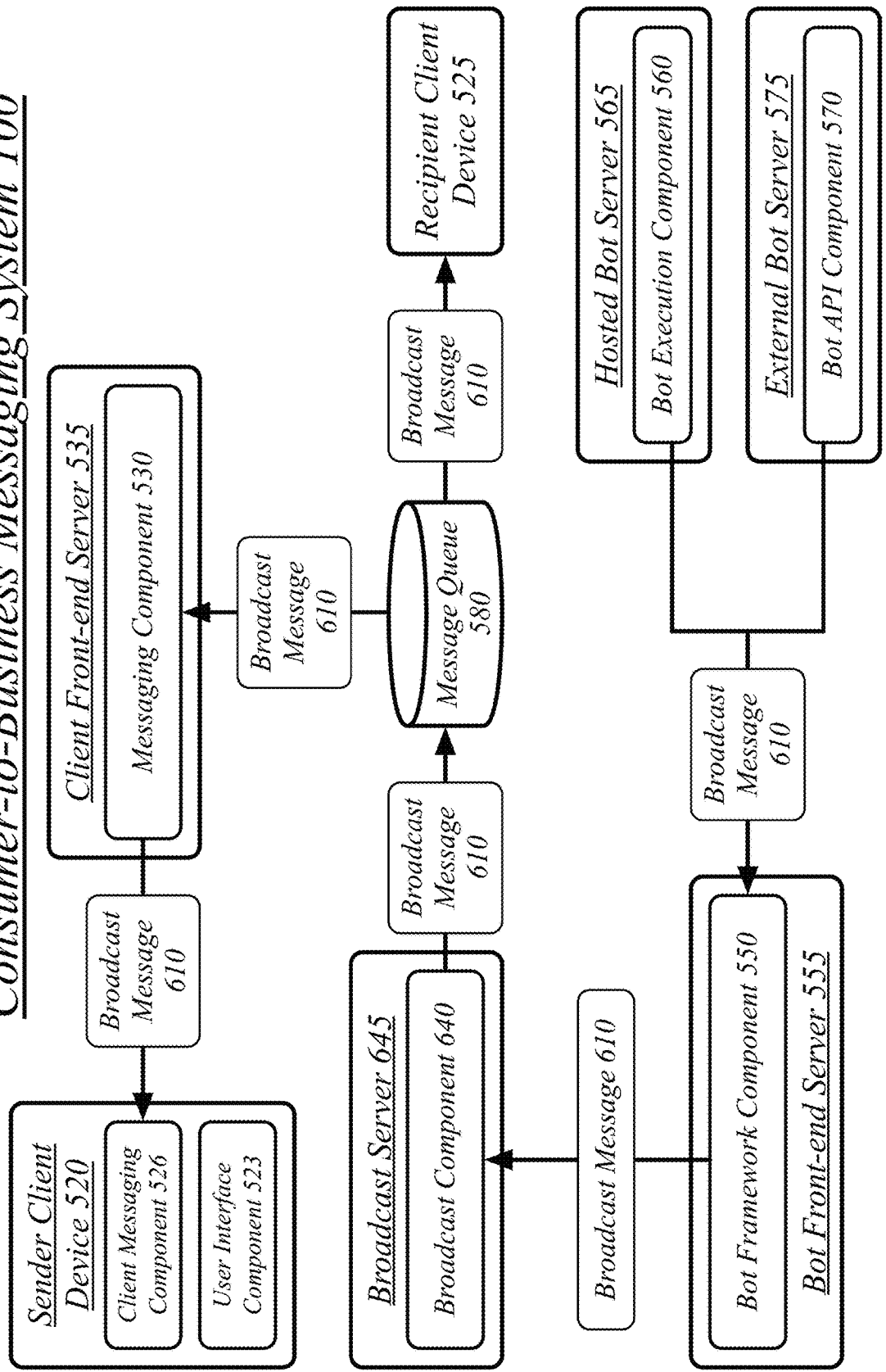
FIG. 6 illustrates an embodiment of a broadcast message in a consumer-to-business messaging system.

FIG. 6 illustrates an embodiment of a broadcast message 610 in a consumer-to-business messaging system 100.

The bot framework component 550 may receive a broadcast message 610 from the messaging bot, the broadcast message 610 specifying a broadcast channel. The bot framework component 550 may assign the distribution of the broadcast message to a broadcast component 640.

A broadcast server 645 may comprise a broadcast component 640. The broadcast component 640 may receive a broadcast message 610 from a messaging bot and determine a plurality of subscriber threads for the broadcast message. Determining the plurality of subscriber threads may be based on the messaging bot, such as by comparing a messaging bot identifier for the messaging bot to the subscription registry to retrieve the thread identifiers for the message threads subscribed to the messaging bot.

The broadcast component 640 may add the broadcast message to a message queue 580 for the user account when the messaging bot channel matches the broadcast channel. A broadcast message may be associated with a messaging bot channel origination indicator so as to indicate the interest the user is subscribed to that resulted in their receiving the broadcast message. This indicator may be displayed in association with the display of the broadcast message 610 on the client device 520.

In some cases, the distribution of a broadcast message 610 may be restricted to a subset of the subscriber set for the messaging bot and the messaging bot channel. A broadcast message 610 may be received in association with a broadcast message target specification. The broadcast component 640 may determine whether the user account matches the broadcast message target specification and add the broadcast message 610 to a message queue 580 for the user account when the user account matches the broadcast message target specification. The broadcast message target specification may specify one or more of demographic information, location information, and interest information.

In some cases, broadcast messages may be restricted to those users that have recently engaged with the messaging bot. A broadcast message target specification may specify a messaging bot engagement recency, which may be measured based on the recency with which the user has opened the message thread with the messaging bot. The broadcast message 610 may distributed to only those users that meet a messaging bot engagement recency specification. This may serve to reward users that engage with the messaging bot. This may serve to focus a bot message on the most active customers that may be most interested in receiving information from the messaging bot, such as a message tailored to highly-active customers. In some embodiments, other user engagement information may also be used to select users, such as users that have engaged with the messaging bot at a minimum specified rate within the recent past or other engagement measures.

In some cases, broadcast messages may be restricted to those users that have recently engaged with a business associated with the messaging bot. A broadcast message target specification may specify a web page engagement recency, which may be measured based on the recency with which the user has opened a web page associated with a business associated with the messaging bot. A web plugin may be embedded in the web page and used to track user visitation with the web page. The broadcast message 610 may distributed to only those users that meet a web page engagement recency specification. This may provide similar benefits to messaging bot engagement recency while expanding those benefits to user engagement with other points of exposure for a business. Other measures of user engagement outside the messaging system 140 may also be used to restrict access, such as a user's physical presence at a location associated with the business, such as a retail location. A user's physical presence at a location may be measured by, for instance, geolocation of a user's mobile device. These measures may be combined, such that a broadcast message target specification specifies that a broadcast message is for delivery to users meeting an engagement recency with any of one or more of messaging, web access, and physical presence.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7A illustrates one embodiment of a first logic flow 700. The logic flow 700 may be representative of some or all of the operations executed by one or more embodiments described herein.

In the illustrated embodiment shown in FIG. 7A, the logic flow 700 may determine a business promotion contact list for a user account for a messaging system at block 702.

The logic flow 700 may determine a predicted business messaging interest for each business contact on the business promotion contact list at block 704.

The logic flow 700 may determine a ranking weight for each business contact on the business promotion contact list based on the predicted business messaging interest for each business contact at block 706.

The logic flow 700 may order the business promotion contact list for display for the user account based on the determined ranking weight for each business contact on the business promotion contact list at block 708.

FIG. 7B illustrates one embodiment of a second logic flow 720. The logic flow 720 may be representative of some or all of the operations executed by one or more embodiments described herein.

In the illustrated embodiment shown in FIG. 7B, the logic flow 720 may receive a bot subscription command for a user account with a messaging system from a client device, the bot subscription command specifying a messaging bot at block 722.

The logic flow 720 may determine a messaging bot channel for the messaging bot at block 724.

The logic flow 720 may subscribe the user account to the messaging bot channel for the messaging bot in response to the bot subscription command at block 726.

The logic flow 720 may receive a broadcast message from the messaging bot, the messaging bot specifying a broadcast channel at block 728.

The logic flow 720 may add the broadcast message to a message queue for the user account when the messaging bot channel matches the broadcast channel at block 730.

The embodiments are not limited to these examples.

Figure 8:
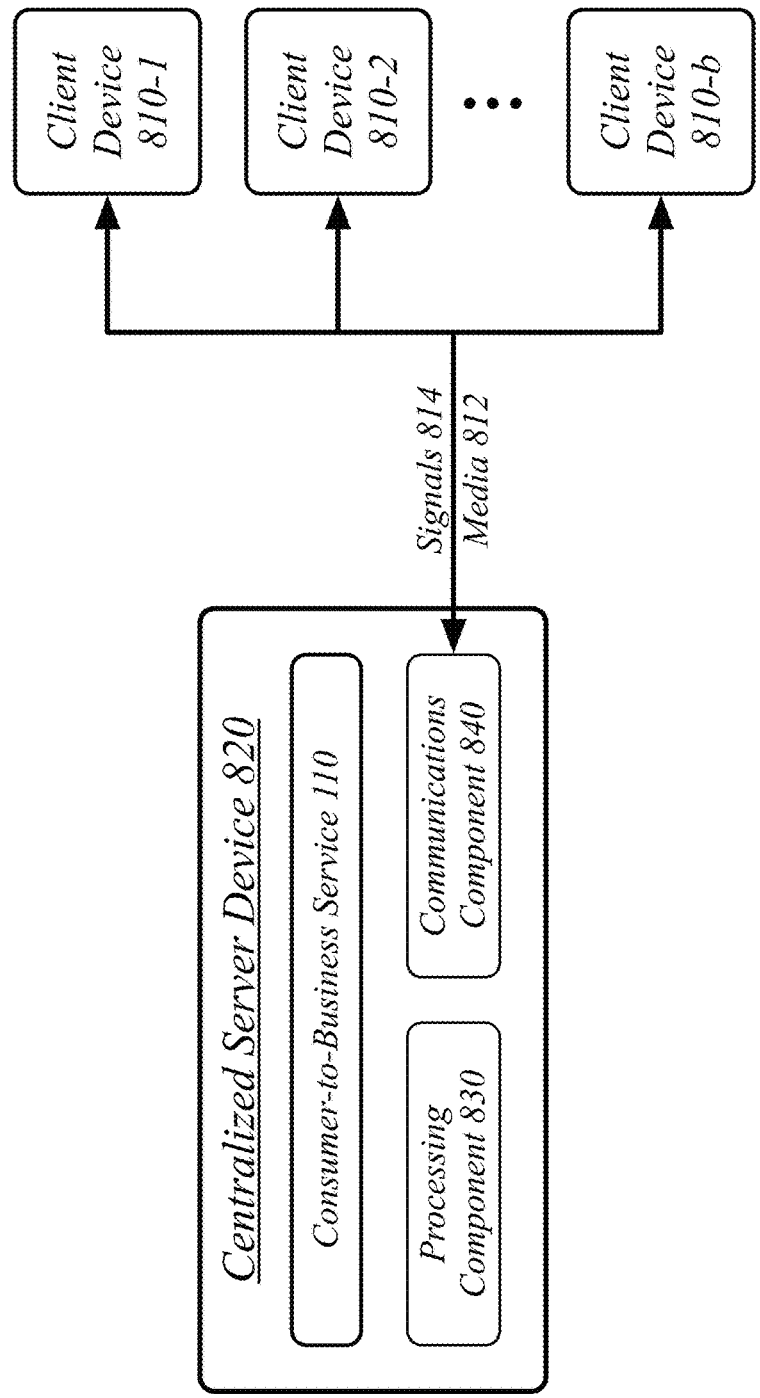
FIG. 8 illustrates an embodiment of a centralized system for the system of FIG. 1.

FIG. 8 illustrates a block diagram of a centralized system 800. The centralized system 800 may implement some or all of the structure and/or operations for the consumer-to-business messaging system 100 in a single computing entity, such as entirely within a single centralized server device 820.

The centralized server device 820 may comprise any electronic device capable of receiving, processing, and sending information for the consumer-to-business messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 820 may execute processing operations or logic for the consumer-to-business messaging system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 820 may execute communications operations or logic for the consumer-to-business messaging system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 820 may implement the consumer-to-business service 110 in a single computing entity. The centralized server device 820 may communicate with other devices over a communications media 812 using communications signals 814 via the communications component 840. The devices may be internal or external to the centralized server device 820 as desired for a given implementation. The centralized server device 820 may communicate with a plurality of client devices 810, such as may comprise the client device 120, client device 320, client device 420, sender client device 520, recipient client device 525, or any other client device.

Figure 9:
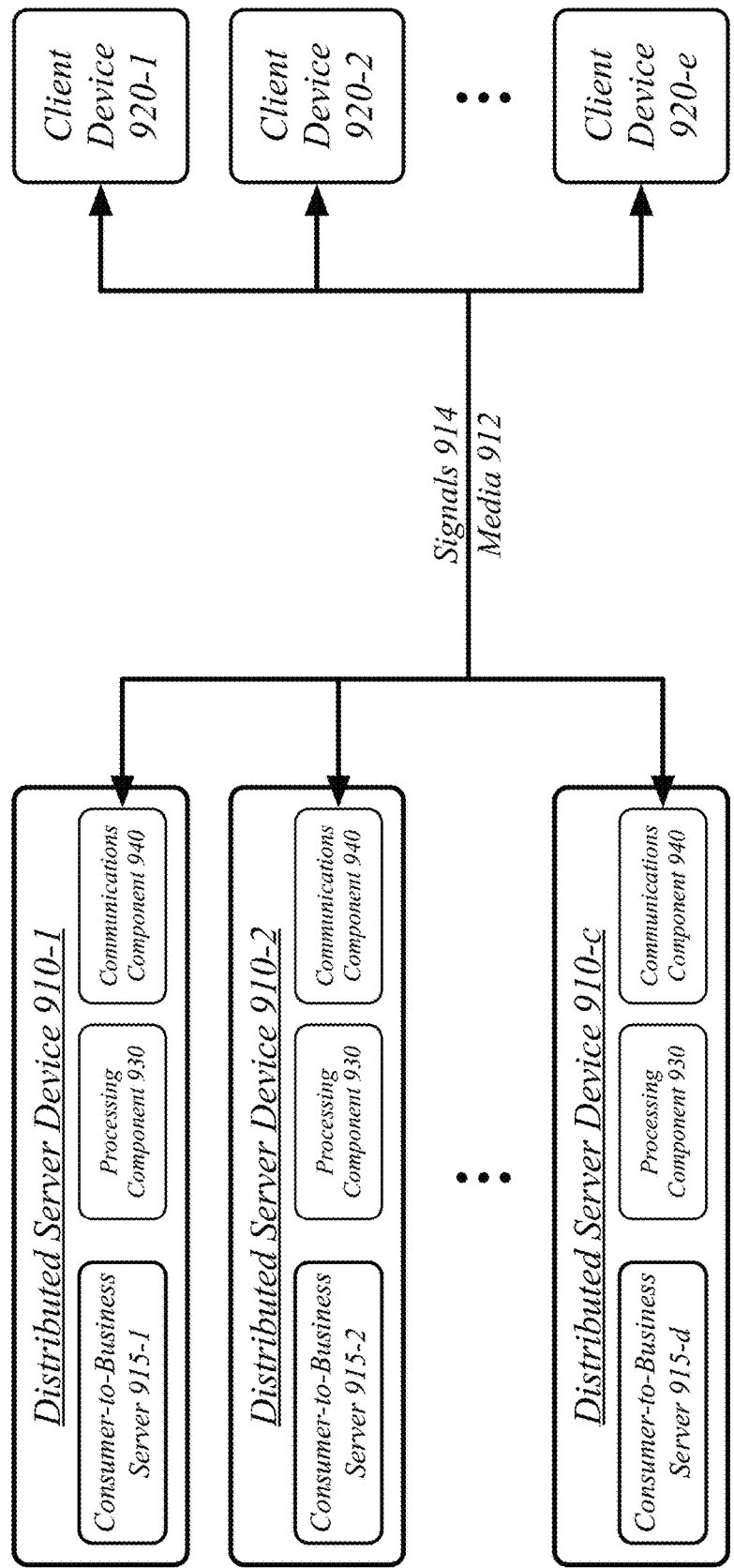
FIG. 9 illustrates an embodiment of a distributed system for the system of FIG. 1.

FIG. 9 illustrates a block diagram of a distributed system 900. The distributed system 900 may distribute portions of the structure and/or operations for the consumer-to-business messaging system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of distributed server devices 910. In general, the server devices 910 may be the same or similar to the centralized server device 820 as described with reference to FIG. 8. For instance, the server devices 910 may each comprise a processing component 930 and a communications component 940 which are the same or similar to the processing component 830 and the communications component 840, respectively, as described with reference to FIG. 8. In another example, the server devices 910 may communicate over a communications media 912 using communications signals 914 via the communications components 940.

The distributed server devices 910 may comprise or employ one or more server programs that operate to perform various methodologies in accordance with the described embodiments. In one embodiment, for example, the distributed server devices 910 may each implement one or more consumer-to-business servers 915. The consumer-to-business servers 915 may collectively implement the consumer-to-business service 110 as a distributed computing entity. The consumer-to-business servers 915 may communicate with a plurality of client devices 920, such as may comprise the client device 120, client device 320, client device 420, sender client device 520, recipient client device 525, client devices 810, or any other client device.

Figure 10:
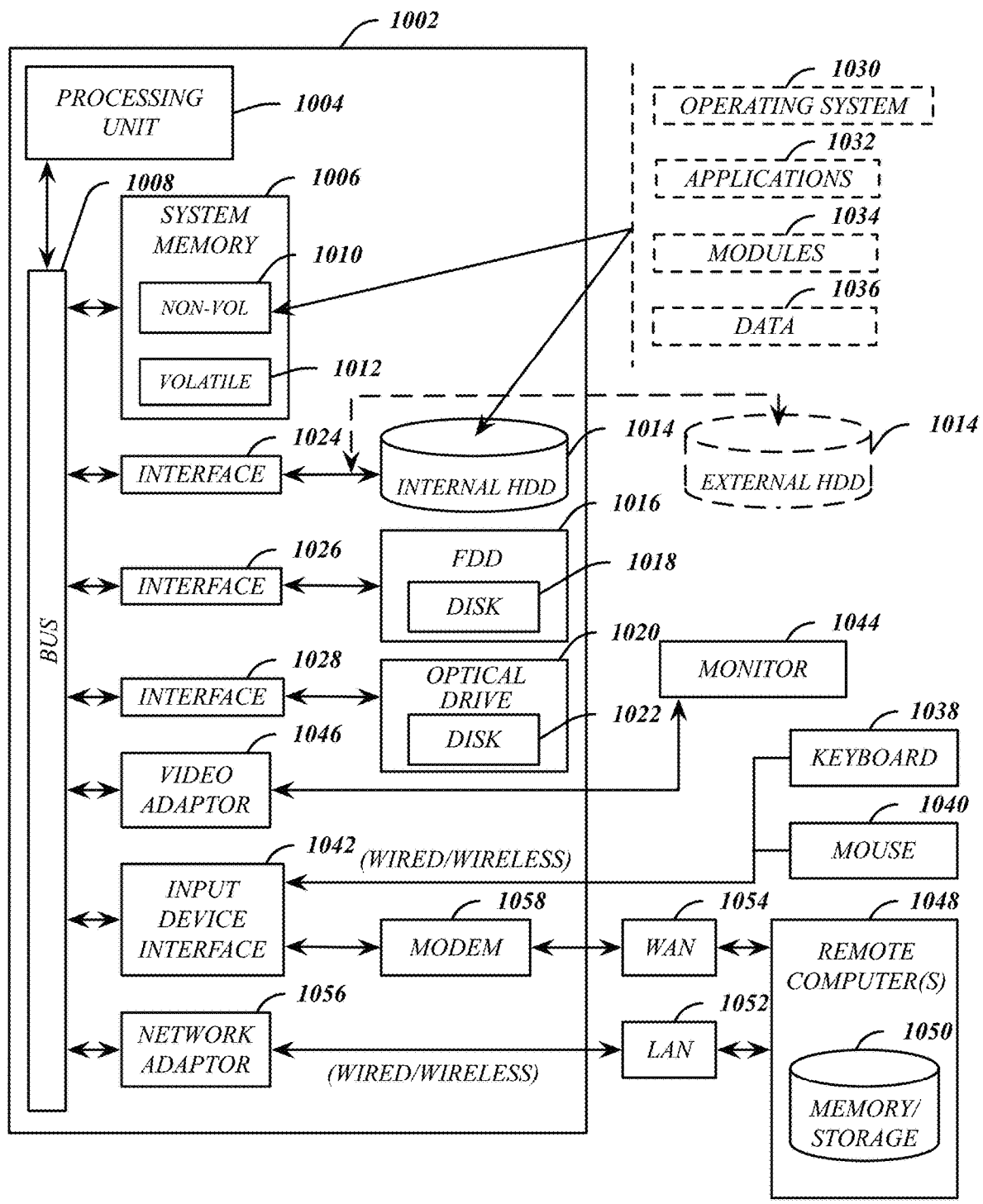
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the consumer-to-business messaging system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
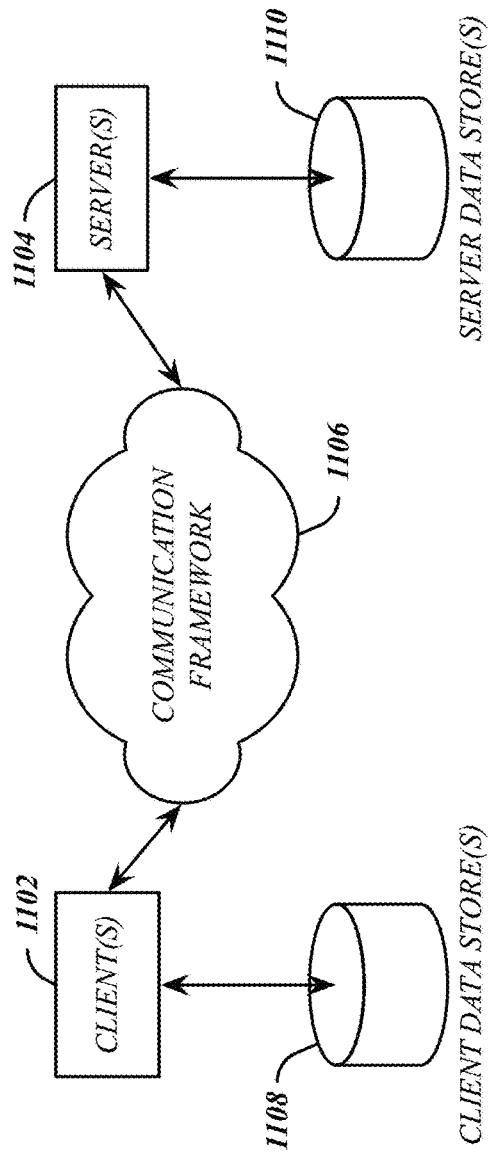
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement client devices such as client device 120, client device 320, client device 420, sender client device 520, recipient client device 525, client devices 810, client devices 920, or any other client device. The servers 1104 may implement the consumer-to-business service 110 as a centralized or distributed entity. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
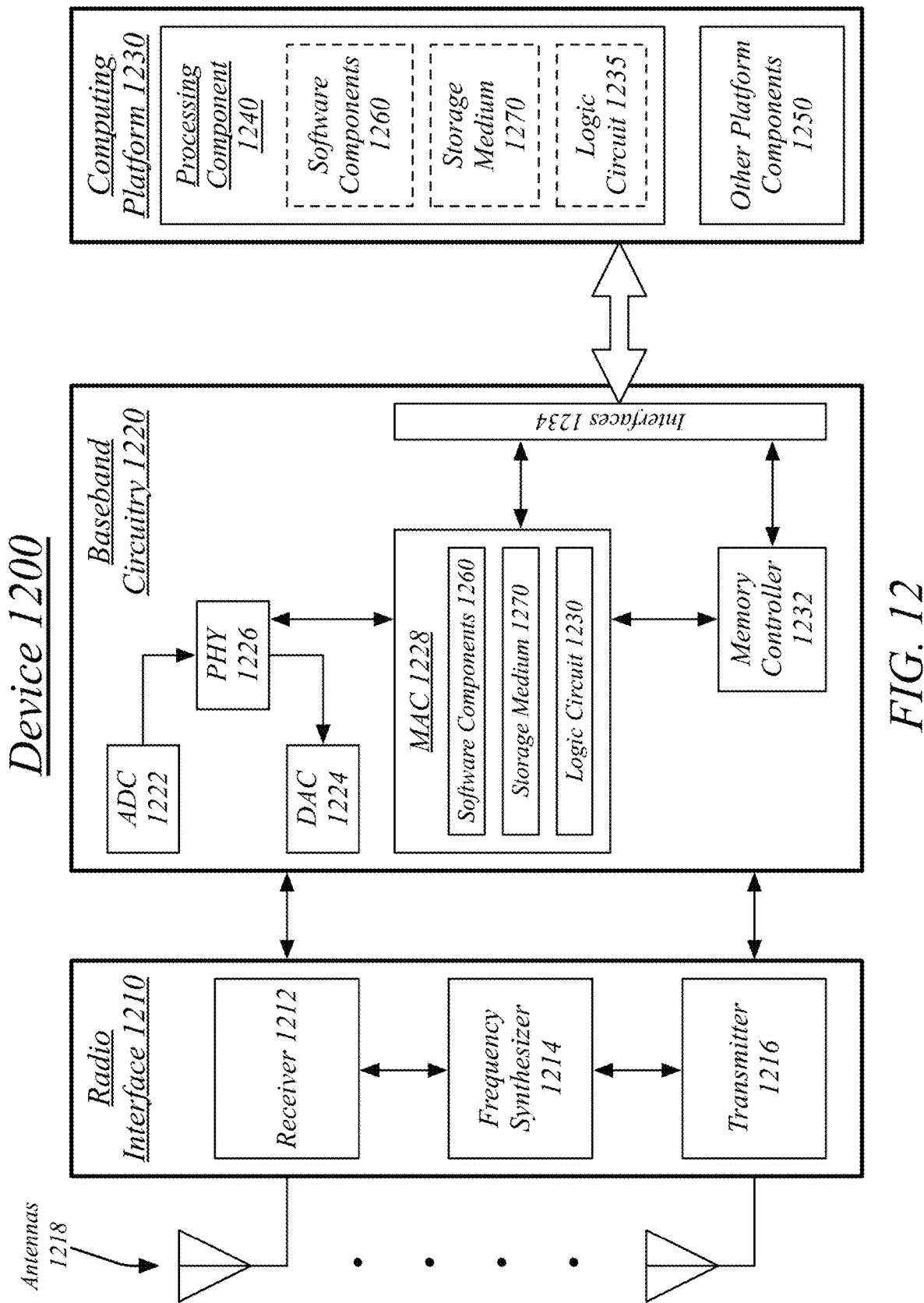
FIG. 12 illustrates an embodiment of a radio device architecture.

FIG. 12 illustrates an embodiment of a device 1200 for use in a multicarrier OFDM system, such as the consumer-to-business messaging system 100. Device 1200 may implement, for example, software components 1260 as described with reference to consumer-to-business messaging system 100 and/or a logic circuit 1235. The logic circuit 1235 may include physical circuits to perform operations described for the consumer-to-business messaging system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the consumer-to-business messaging system 100 and/or logic circuit 1235 in a single computing entity, such as entirely within a single device. Alternatively, the device 1200 may distribute portions of the structure and/or operations for the consumer-to-business messaging system 100 and/or logic circuit 1235 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the consumer-to-business messaging system 100 and logic circuit 1235 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise determining a business promotion contact list for a user account for a messaging system; determining a predicted business messaging interest for each business contact on the business promotion contact list; determining a ranking weight for each business contact on the business promotion contact list based on the predicted business messaging interest for each business contact; and ordering the business promotion contact list for display for the user account based on the determined ranking weight for each business contact on the business promotion contact list.

A computer-implemented method may further comprise wherein the predicted business messaging interest is based on a business responsiveness rate, a business responsiveness speed, and a friend engagement measure for each business contact.

A computer-implemented method may further comprise the friend engagement measure comprising a measure of whether friends for the user account on the messaging system have liked the business contact with the messaging system.

A computer-implemented method may further comprise the friend engagement measure comprising a measure of whether friends for the user account on the messaging system have messaged with the business contact via the messaging system.

A computer-implemented method may further comprise wherein the predicted business messaging interest is based on a linear function of a business responsiveness rate, a business responsiveness speed, and a friend engagement measure for each business contact.

A computer-implemented method may further comprise the linear function determined based on a linear regression of a historical data set for the messaging system.

A computer-implemented method may further comprise receiving one or more business features for each business contact on the business promotion contact list; receiving one or more profile features for one or more users of the messaging system; receiving a messaging history for the messaging system; generating a predicted business messaging interest model for the messaging system based on a machine learning analysis of the messaging history, the predicted business messaging interest model based on the one or more profile features and the one or more business features; and determining the predicted business messaging interest for each business contact on the business promotion contact list based on the predicted business messaging interest model.

A computer-implemented method may further comprise wherein the predicted business messaging interest model predicts one or more of user interest in beginning a messaging interaction with a business, user interest in requesting a service via the messaging interaction with the business, and user satisfaction from requesting the service via the messaging interaction with the business.

A computer-implemented method may further comprise wherein the predicted business messaging interest model predicts one or more of user interest in subscribing with a business, user time spent reading subscription messages from the business, user responsiveness to subscription notifications for the business, and user blocking of the business.

A computer-implemented method may further comprise the predicted business messaging interest model additionally based on a user context.

A computer-implemented method may further comprise the user context comprising a current user location.

A computer-implemented method may further comprise the messaging history including one or more of a short message service messaging history and a phone record history.

A computer-implemented method may further comprise generating a predicted business messaging interest model for the messaging system based on a machine learning analysis of the messaging history and a web contact history.

A computer-implemented method may further comprise generating a seed business promotion contact list for the user account; and expanding the seed business promotion contact list to generate the business promotion contact list by including additional business contacts with similar features to the business contacts on the seed promotion contact list.

A computer-implemented method may further comprise the user account associated with one or more friends with the messaging system, wherein the seed business promotion contact list is based on a list of business contacts the user account has messaged with via the messaging system and a list of business contacts the friends of the user account have messaged with via the messaging system.

A computer-implemented method may further comprise determining feature weights for expanding the seed business promotion contact list based on a machine learning analysis of a messaging history for the messaging system.

A computer-implemented method may further comprise the user account associated with one or more friends with the messaging system, wherein the business promotion contact list for the user account is based on one or more of a list of business contacts the user account has messaged with via the messaging system, a list of business contacts the user account has liked with the messaging system, a list of business contacts the friends of the user account have messaged with via the messaging system, and a list of business contacts the friends the user account have liked with the messaging system.

A computer-implemented method may further comprise the ranking weight reduced for one or more previously-viewed business contacts of the business promotion contact list.

A computer-implemented method may further comprise wherein each business contact on the business promotion contact list is associated with a business page comprising business information with the messaging system.

A computer-implemented method may further comprise wherein each business contact on the business promotion contact list is operative to open a message thread with the business contact when selected.

An apparatus may comprise a processor circuit on a device; a client front-end component operative on the processor circuit to receive a client inbox request for a user account from a client device, the user account for a messaging system; and transmit an ordered business promotion contact list to the client device in response to the client inbox request, the ordered business promotion contact list ordered for display for the user account based on a determined ranking weight for each business contact on the ordered promotion contact list; a business contact list component operative to determine a business promotion contact list for a user account for a messaging system; a predicted interest component operative to determine a predicted business messaging interest for each business contact on the business promotion contact list; and a contact ranking component operative to determine a ranking weight for each business contact on the business promotion contact list based on the predicted business messaging interest for each business contact. The apparatus may be operative to implement any of the computer-implemented methods described herein.

A computer-implemented method may comprise receiving a bot subscription command for a user account with a messaging system from a client device, the bot subscription command specifying a messaging bot; determining a messaging bot channel for the messaging bot; subscribing the user account to the messaging bot channel for the messaging bot in response to the bot subscription command; receiving a broadcast message from the messaging bot, the broadcast message specifying a broadcast channel; and adding the broadcast message to a message queue for the user account when the messaging bot channel matches the broadcast channel.

A computer-implemented method may further comprise the messaging bot channel automatically determined as a default messaging bot channel for the messaging bot.

A computer-implemented method may further comprise receiving a block command in association with the user account for the messaging bot; blocking communication from the messaging bot for the user account; and unsubscribing the user account from any messaging bot channel for the messaging bot.

A computer-implemented method may further comprise determining a block rate for the messaging bot; and flagging the messaging bot for review when the block rate exceeds a predefined threshold.

A computer-implemented method may further comprise receiving a bot subscription command for the user account; sending a subscription configuration package to the client device for the user account, the subscription configuration package comprising a listing of a plurality of messaging bot channels for the messaging bot, the subscription configuration package operative to configure the client device for the selection of one or more selected messaging bot channels of the plurality of messaging bot channels; and determining the messaging bot channel for the messaging bot based on the one or more selected messaging bot channels.

A computer-implemented method may further comprise the subscription configuration package for display during an initial display of a messaging bot thread for the messaging bot.

A computer-implemented method may further comprise the bot subscription command received based on a bot recommendation interface.

A computer-implemented method may further comprise the bot recommendation interface comprising a plurality of business contacts in a business promotion contact list, the business promotion contact list configured based on a predicted business messaging interest model, wherein the predicted business messaging interest model predicts one or more of user interest in subscribing with a business, user time spent reading subscription messages from the business, user responsiveness to subscription notifications for the business, user unsubscribing for channels for the business, and user blocking of the business.

A computer-implemented method may further comprise the bot subscription command received in association with an information display associated with the messaging bot in a news feed interface.

A computer-implemented method may further comprise the bot subscription command received in association with a web page display associated with the messaging bot.

A computer-implemented method may further comprise determining the messaging bot channel as a broadcast channel associated with the web page display.

A computer-implemented method may further comprise the broadcast message associated with a messaging bot channel origination indicator.

A computer-implemented method may further comprise receiving a bot unsubscription command for the user account, the bot subscription command specifying the messaging bot and the messaging bot channel; unsubscribing the user account from the messaging bot channel for the messaging bot in response to the bot unsubscription command; and recording the bot unsubscription command in an unsubscribing history for a machine learning model.

A computer-implemented method may further comprise the broadcast message received in association with a broadcast message target specification, further comprising: determining whether the user account matches the broadcast message target specification; and adding the broadcast message to a message queue for the user account when the user account matches the broadcast message target specification.

A computer-implemented method may further comprise the broadcast message target specification specifying one or more of demographic information, location information, and interest information.

A computer-implemented method may further comprise the broadcast message target specification specifying a messaging bot engagement recency.

A computer-implemented method may further comprise the broadcast message target specification specifying a web page engagement recency.

An apparatus may comprise a processor circuit on a device; a messaging component operative on the processor circuit to receive a bot subscription command for a user account with a messaging system from a client device, the bot subscription command specifying a messaging bot; a bot framework component operative to determine a messaging bot channel for the messaging bot; subscribe the user account to the messaging bot channel for the messaging bot in response to the bot subscription command; and receive a broadcast message from the messaging bot, the messaging bot specifying a broadcast channel; and a broadcast component operative to add the broadcast message to a message queue for the user account when the messaging bot channel matches the broadcast channel. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   determining a business promotion contact list for an account for a social networking system, the business promotion contact list initially comprising business contacts the account has messaged, and business contacts that friends of the account on the social networking system have messaged, indicating a potential interest in messaging each business contact;
   determining a predicted business messaging interest for each business contact based on weights of a linear function applied to a responsiveness rate to messages received by the business contact and an average amount of time for the business contact to respond to received messages, the weights trained based on the responsiveness rate of each business contact, the average amount of time for each business contact to respond to received messages, and a friend engagement measure for each business contact, wherein the friend engagement measure is based at least in part on whether the friends of the account have liked a page for the business contact on the social networking system;
   determining a ranking weight for each business contact based on the predicted business messaging interest for each business contact; and
   ordering the business promotion contact list for display for the account based on the determined ranking weights.

2. The method of claim 1, wherein the predicted business messaging interest is further based on the friend engagement measure for each business contact.

3. The method of claim 1, wherein a linear regression modifies the weights of the linear function.

4. The method of claim 1, further comprising:
   receiving a plurality of business features for each business contact on the business promotion contact list;
   receiving a plurality of profile features for a plurality of accounts of the social networking system;
   receiving a messaging history for the social networking system;
   generating a predicted business messaging interest model for the social networking system based on a machine learning analysis of the messaging history, the predicted business messaging interest model based on the plurality of profile features and the plurality of business features; and
   determining the predicted business messaging interest for each business contact on the business promotion contact list based on the predicted business messaging interest model.

5. The method of claim 4, wherein the predicted business messaging interest model predicts one or more of user interest in beginning a messaging interaction with a business, user interest in requesting a service via the messaging interaction with the business, and user satisfaction from requesting the service via the messaging interaction with the business.

6. The method of claim 4, wherein the predicted business messaging interest model predicts one or more of user interest in subscribing with a business, user time spent reading subscription messages from the business, user responsiveness to subscription notifications for the business, and user blocking of the business.

7. The method of claim 1, the account associated with one or more friends with the social networking system, further comprising:
   generating a seed business promotion contact list for the account, wherein the seed business promotion contact list is based on a list of business contacts the account has messaged with via the social networking system and a list of business contacts the friends of the account have messaged with via the social networking system; and
   determining feature weights for the seed business promotion contact list based on a machine learning analysis of a messaging history for the social networking system; and
   expanding the seed business promotion contact list to generate the business promotion contact list by including additional business contacts with similar features to the business contacts on the seed business promotion contact list.

8. An apparatus, comprising:
   a processor circuit on a device;
   memory, for execution on the processor circuit, the memory containing instructions implementing:
   a client front-end component operative to:
      receive a client inbox request for an account from a client device, the account for a social networking system; and
      transmit an ordered business promotion contact list to the client device in response to the client inbox request, the ordered business promotion contact list ordered for display for the account based on a determined ranking weight for each business contact on the ordered promotion contact list;
   a business contact list component operative to:
      determine a business promotion contact list for the account, the business promotion contact list initially comprising business contacts the account has messaged, and business contacts that friends of the account on the social networking system have messaged, indicating a potential user interest in messaging each business contact;
   a predicted interest component operative to:
      determine a predicted business messaging interest for each business contact based on weights of a linear function applied to a responsiveness rate to messages received by the business contact and an average amount of time for the business contact to respond to received messages, the weights trained based on the responsiveness rate of each business contact, the average amount of time for each business contact to respond to received messages, and a friend engagement measure for each business contact, wherein the friend engagement measure is based at least in part on whether the friends of the account have liked a page for the business contact on the social networking system; and
   a contact ranking component operative to:
      determine the ranking weight for each business contact on the business promotion contact list based on the predicted business messaging interest for each business contact.

9. The apparatus of claim 8, wherein the predicted business messaging interest is further based on the friend engagement measure for each business contact.

10. The apparatus of claim 8, wherein a linear regression modifies the weights of the linear function.

11. The apparatus of claim 8, further comprising:
    the predicted interest component operative to receive a plurality of business features for each business contact on the business promotion contact list; receive a plurality of profile features for a plurality of accounts of the social networking system; receive a messaging history for the social networking system; generate a predicted business messaging interest model for the social networking system based on a machine learning analysis of the messaging history, the predicted business messaging interest model based on the plurality of profile features and the plurality of business features; and determine the predicted business messaging interest for each business contact on the business promotion contact list based on the predicted business messaging interest model.

12. The apparatus of claim 11, wherein the predicted business messaging interest model predicts one or more of user interest in beginning a messaging interaction with a business, user interest in requesting a service via the messaging interaction with the business, and user satisfaction from requesting the service via the messaging interaction with the business.

13. The apparatus of claim 11, wherein the predicted business messaging interest model predicts one or more of user interest in subscribing with a business, user time spent reading subscription messages from the business, user responsiveness to subscription notifications for the business, and user blocking of the business.

14. The apparatus of claim 8, the account associated with one or more friends with the social networking system, further comprising:
the business contact list component operative to generate a seed business promotion contact list for the account, wherein the seed business promotion contact list is based on a list of business contacts the account has messaged with via the social networking system and a list of business contacts the friends of the account have messaged with via the social networking system; and determine feature weights for the seed business promotion contact list based on a machine learning analysis of a messaging history for the social networking system; and expand the seed business promotion contact list to generate the business promotion contact list by including additional business contacts with similar features to the business contacts on the seed business promotion contact list.

15. At least one computer-readable storage medium comprising instructions that, when executed, cause a system to:
determine a business promotion contact list for an account for a social networking system, the business promotion contact list initially comprising business contacts the account has messaged, and business contacts that friends of the account on the social networking system have messaged, indicating a potential interest in messaging each business contact;
determine a predicted business messaging interest for each business contact based on weights of a linear function applied to a responsiveness rate to messages received by the business contact and an average amount of time for the business contact to respond to received messages, the weights trained based on the responsiveness rate of each business contact, the average amount of time for each business contact to respond to received messages, and a friend engagement measure for each business contact, wherein the friend engagement measure is based at least in part on whether the friends of the account have liked a page for the business contact on the social networking system;
determine a ranking weight for each business contact based on the predicted business messaging interest for each business contact; and
order the business promotion contact list for display for the account based on the determined ranking weights.

16. The computer-readable storage medium of claim 15, wherein a linear regression modifies the weights of the linear function, wherein the predicted business messaging interest is further based on the friend engagement measure for each business contact.

17. The computer-readable storage medium of claim 15, comprising further instructions that, when executed, cause the system to:
receive a plurality of business features for each business contact on the business promotion contact list;
receive a plurality of profile features for a plurality of accounts of the social networking system;
receive a messaging history for the social networking system;
generate a predicted business messaging interest model for the social networking system based on a machine learning analysis of the messaging history, the predicted business messaging interest model based on the plurality of profile features and the plurality of business features; and
determine the predicted business messaging interest for each business contact on the business promotion contact list based on the predicted business messaging interest model.

18. The computer-readable storage medium of claim 17, wherein the predicted business messaging interest model predicts one or more of user interest in beginning a messaging interaction with a business, user interest in requesting a service via the messaging interaction with the business, and user satisfaction from requesting the service via the messaging interaction with the business.

19. The computer-readable storage medium of claim 17, wherein the predicted business messaging interest model predicts one or more of user interest in subscribing with a business, user time spent reading subscription messages from the business, user responsiveness to subscription notifications for the business, and user blocking of the business.

20. The computer-readable storage medium of claim 15, the account associated with one or more friends with the social networking system, comprising further instructions that, when executed, cause the system to:
generating a seed business promotion contact list for the account, wherein the seed business promotion contact list is based on a list of business contacts the account has messaged with via the social networking system and a list of business contacts the friends of the account have messaged with via the social networking system; and
determining feature weights for the seed business promotion contact list based on a machine learning analysis of a messaging history for the social networking system; and
expanding the seed business promotion contact list to generate the business promotion contact list by including additional business contacts with similar features to the business contacts on the seed business promotion contact list.

* * * * *